(12) United States Patent
Ito

(10) Patent No.: US 10,948,785 B2
(45) Date of Patent: Mar. 16, 2021

(54) ELECTRO-OPTICAL DEVICE, ELECTRONIC APPARATUS, AND METHOD FOR MANUFACTURING ELECTRO-OPTICAL DEVICE

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/791,137

(22) Filed: Feb. 14, 2020

(65) Prior Publication Data

US 2020/0264481 A1 Aug. 20, 2020

(30) Foreign Application Priority Data

Feb. 15, 2019 (JP) .............................. JP2019-025273

(51) Int. Cl.

| G02F 1/1343 | (2006.01) |
|---|---|
| G02F 1/1333 | (2006.01) |
| G09G 3/296 | (2013.01) |
| G02F 1/1362 | (2006.01) |
| G09G 3/36 | (2006.01) |

(52) U.S. Cl.
CPC .... *G02F 1/134336* (2013.01); *G02F 1/13624* (2013.01); *G02F 1/133345* (2013.01); *G09G 3/296* (2013.01); *G09G 3/3648* (2013.01); *G02F 2201/123* (2013.01); *G09G 2300/0426* (2013.01); *G09G 2300/08* (2013.01)

(58) Field of Classification Search
CPC ......... G02F 1/134336; G02F 1/133345; G02F 1/13624; G02F 2201/123; G09G 3/296; G09G 3/3648; G09G 2300/08; G09G 2300/0426
USPC .......................................................... 349/139
See application file for complete search history.

(56) References Cited

U.S. PATENT DOCUMENTS

2014/0118664 A1* 5/2014 Nimura ................ G02B 27/149
349/95
2018/0173048 A1 6/2018 Ito et al.

FOREIGN PATENT DOCUMENTS

| JP | H11-024060 A | 1/1999 |
|---|---|---|
| JP | 2001-201736 A | 7/2001 |
| JP | 2006-039265 A | 2/2006 |
| JP | 2011-081229 A | 4/2011 |
| JP | 2011081229 A * | 4/2011 |
| JP | 2018-100994 A | 6/2018 |

* cited by examiner

*Primary Examiner* — Nathanael R Briggs
*Assistant Examiner* — William D Peterson
(74) *Attorney, Agent, or Firm* — Oliff PLC

(57) ABSTRACT

An electro-optical device according to the present disclosure includes an insulating base having translucency and insulating properties, a pixel electrode disposed apart from the insulating base, and a switching element electrically coupled to the pixel electrode. The insulating base includes a base portion, and a lens portion that is located between the base portion and the pixel electrode and includes a lens overlapping the pixel electrode in plan view when viewed from a thickness direction of the pixel electrode. The base portion and the lens are disposed with a space therebetween.

8 Claims, 15 Drawing Sheets

ELECTRO-OPTICAL DEVICE, ELECTRONIC APPARATUS, AND METHOD FOR MANUFACTURING ELECTRO-OPTICAL DEVICE

The present application is based on, and claims priority from JP Application Serial Number 2019-025273, filed Feb. 15, 2019, the disclosure of which is hereby incorporated by reference herein in its entirety.

BACKGROUND

1. Technical Field

The present disclosure relates to an electro-optical device, an electronic apparatus, and a method for manufacturing an electro-optical device.

2. Related Art

An electro-optical device such as a liquid crystal device is known. The liquid crystal device is used as a light valve of a projector, for example. JP-A-2018-100994 discloses an example of a liquid crystal device. The liquid crystal device includes an element substrate, a counter substrate, and a liquid crystal layer disposed between the element substrate and the counter substrate. The element substrate includes a substrate, a pixel electrode provided for each pixel, and a switching element provided corresponding to the pixel electrode. In order to improve utilization efficiency of light in the element substrate, a lens layer including a lens is provided between the substrate and the pixel electrode. The lens layer is in contact with the substrate, and has a refractive index greater than a refractive index of the substrate.

In terms of enhancing lens performance, a difference in refractive index between the substrate and the lens layer may be increased. It is conceivable that, for example, a refractive index of the lens layer is increased in order to increase a difference in refractive index. However, when a refractive index of the lens layer is increased, heat resistance to annealing treatment during formation of the switching element tends to decrease, and warpage that may occur in the lens layer tends to increase in general. As a result, there is a problem in that the lens performance decreases, and the utilization efficiency of the light decreases.

SUMMARY

An aspect of an electro-optical device according to the present disclosure includes an insulating base having translucency and insulating properties, a pixel electrode disposed apart from the insulating base, and a switching element electrically coupled to the pixel electrode, where the insulating base includes a base portion, and a lens portion that is located between the base portion and the pixel electrode and includes a lens overlapping the pixel electrode in plan view when viewed from a thickness direction of the pixel electrode, and the base portion and the lens are disposed with a space therebetween.

An aspect of a method for manufacturing an electro-optical device according to the present disclosure includes forming an insulating base having translucency and insulating properties, forming a switching element at the insulating base, and forming a pixel electrode electrically coupled to the switching element, where the formation of the insulating base includes forming a base portion and a lens portion with a space therebetween, the lens portion being located between the base portion and the pixel electrode and including a lens overlapping the pixel electrode in plan view when viewed from a thickness direction of the pixel electrode.

DESCRIPTION OF EXEMPLARY EMBODIMENTS

Figure 1:
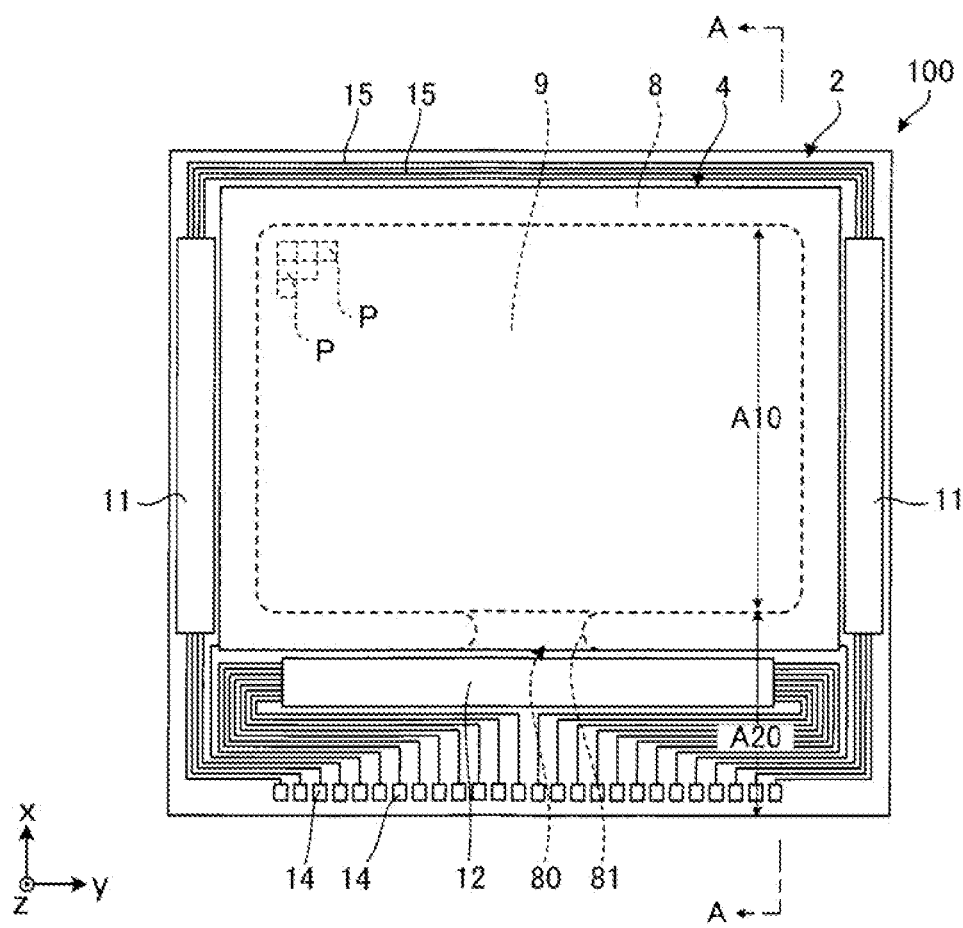
FIG. 1 is a plan view of an electro-optical device according to a first exemplary embodiment.

Preferred exemplary embodiments of the present disclosure will be described below with reference to the accompanying drawings. Note that, in the drawings, dimensions and scales of sections are differed from actual dimensions and scales as appropriate, and some of the sections are schematically illustrated to make them easily recognizable. Further, the scope of the present disclosure is not limited to these exemplary embodiments unless otherwise stated to limit the present disclosure in the following descriptions.

1. Electro-optical Device

1-1. First Exemplary Embodiment

As an example of an electro-optical device of the present disclosure, an active matrix liquid crystal display device will be described as an example.

1-1a. Basic Configuration

Figure 2:
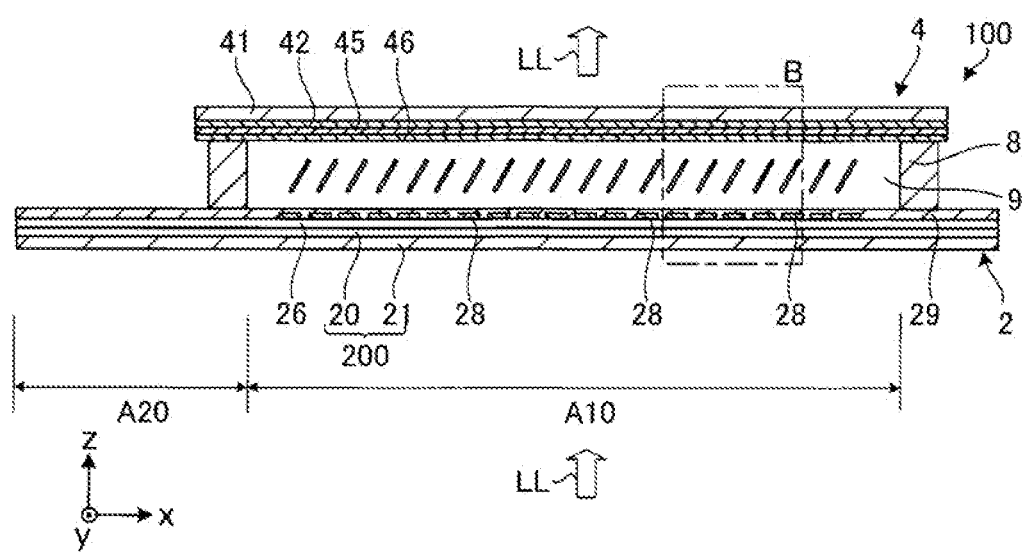
FIG. 2 is a cross-sectional view of the electro-optical device according to the first exemplary embodiment.

FIG. 1 is a schematic plan view of an electro-optical device 100 according to a first exemplary embodiment. FIG. 2 is a schematic cross-sectional view of the electro-optical device 100 according to the first exemplary embodiment, and is a cross-sectional view of the electro-optical device 100 taken along an A-A line in FIG. 1. Note that, for convenience of explanation, the description will be made appropriately using an x-axis, a y-axis, and a z-axis orthogonal to each other illustrated in each of FIGS. 1 and 2.

The electro-optical device 100 illustrated in FIGS. 1 and 2 serves as a transmissive-type liquid crystal display device. As illustrated in FIG. 2, the electro-optical device 100 includes an element substrate 2 having translucency, a counter substrate 4 having translucency, a sealing member 8 having a frame shape, and a liquid crystal layer 9 serving as a "liquid crystal". The sealing member 8 is disposed between the element substrate 2 and the counter substrate 4. The liquid crystal layer 9 is disposed in a region surrounded by the element substrate 2, the counter substrate 4, and the sealing member 8. Here, an alignment direction of the element substrate 2, the liquid crystal layer 9, and the counter substrate 4 is a z direction, and a surface of the element substrate 2 is parallel to an x-y plane. Further, viewing from the z direction parallel to a thickness direction of a lens layer 22, which will be described later, included in the element substrate 2 is referred to as "plan view".

In the present exemplary embodiment, a case in which light LL is incident on the electro-optical device 100 from the element substrate 2, is transmitted through the liquid crystal layer 9, and is emitted from the counter substrate 4 will be described as an example. Note that, in the specification, incident light being incident on the electro-optical device 100, light being transmitted through the electro-optical device 100, and emission light being emitted from the electro-optical device 100 are all described as the light LL without any distinction. Further, in the specification, "translucency" refers to transparency to visible light, and means that a transmittance of visible light may be greater than or equal to 50%. As illustrated in FIG. 1, the electro-optical device 100 has a rectangular shape in plan view, but a planar shape of the electro-optical device 100 is not limited to the rectangular shape and may be a round shape and the like, for example.

As illustrated in FIG. 1, the element substrate 2 has a size encompassing the counter substrate 4 in plan view. As illustrated in FIG. 2, the element substrate 2 includes an insulating base 200, a wiring layer 26, a plurality of pixel electrodes 28, and a first alignment film 29. The insulating base 200, the wiring layer 26, the plurality of pixel electrodes 28, and the first alignment film 29 are arranged in this order. The first alignment film 29 is located closest to the liquid crystal layer 9. The insulating base 200 includes a base portion 21 and a light guide portion 20. The pixel electrode 28 has translucency, and is formed of a transparent conductive material such as indium tin oxide (ITO) or indium zinc oxide (IZO), for example. The first alignment film 29 aligns liquid crystal molecules of the liquid crystal layer 9. Examples of the constituent material of the first alignment film 29 include polyimide and silicon oxide, for example. Note that the element substrate 2 will be described later.

As illustrated in FIG. 2, the counter substrate 4 includes a base 41, an insulating layer 42, a counter electrode 45, and a second alignment film 46. The base 41, the insulating layer 42, the counter electrode 45, and the second alignment film 46 are arranged in this order. The second alignment film 46 is located closest to the liquid crystal layer 9. The base 41 is formed of a flat plate having translucency and insulating properties. The base 41 is formed of glass, quartz, or the like, for example. The insulating layer 42 is formed of a silicon-based inorganic material having translucency and insulating properties, such as silicon oxide, for example. The counter electrode 45 is formed of a transparent conductive material such as ITO or IZO, for example. The second alignment film 46 aligns the liquid crystal molecules of the liquid crystal layer 9. Examples of the constituent material of the second alignment film 46 include polyimide and silicon oxide, for example.

The sealing member 8 is formed by using an adhesive containing various types of curable resins such as epoxy resin, for example. The sealing member 8 is fixed to each of the element substrate 2 and the counter substrate 4. An injection port 81 for injecting a liquid crystal material containing liquid crystal molecules is formed in a part of the sealing member 8, and the injection port 81 is sealed by a sealing material 80 formed by using various resin materials.

The liquid crystal layer 9 contains the liquid crystal molecules having positive or negative dielectric anisotropy. The liquid crystal layer 9 is interposed between the element substrate 2 and the counter substrate 4 such that the liquid crystal molecules are in contact with both the first alignment film 29 and the second alignment film 46. The alignment of the liquid crystal molecules included in the liquid crystal layer 9 varies in accordance with a voltage applied to the liquid crystal layer 9. The liquid crystal layer 9 can achieve grayscale display by modulating the light LL in accordance with the applied voltage.

Further, as illustrated in FIG. 1, a plurality of scanning line driving circuits 11, a signal line driving circuit 12, and a plurality of external terminals 14 are disposed on the surface of the element substrate 2 on the counter substrate 4 side. A routing wire 15 being routed from each of the scanning line driving circuit 11 and the signal line driving circuit 12 is coupled to the external terminal 14.

The electro-optical device 100 having such a configuration includes a display region A10 in which an image and the like are displayed and a peripheral region A20 surrounding the display region A10 in plan view. The display region 10A includes a plurality of pixels P arranged in a matrix pattern. The scanning line driving circuit 11, the signal line driving circuit 12, and the like are disposed in the peripheral region A20.

1-1b. Electrical Configuration

Figure 3:
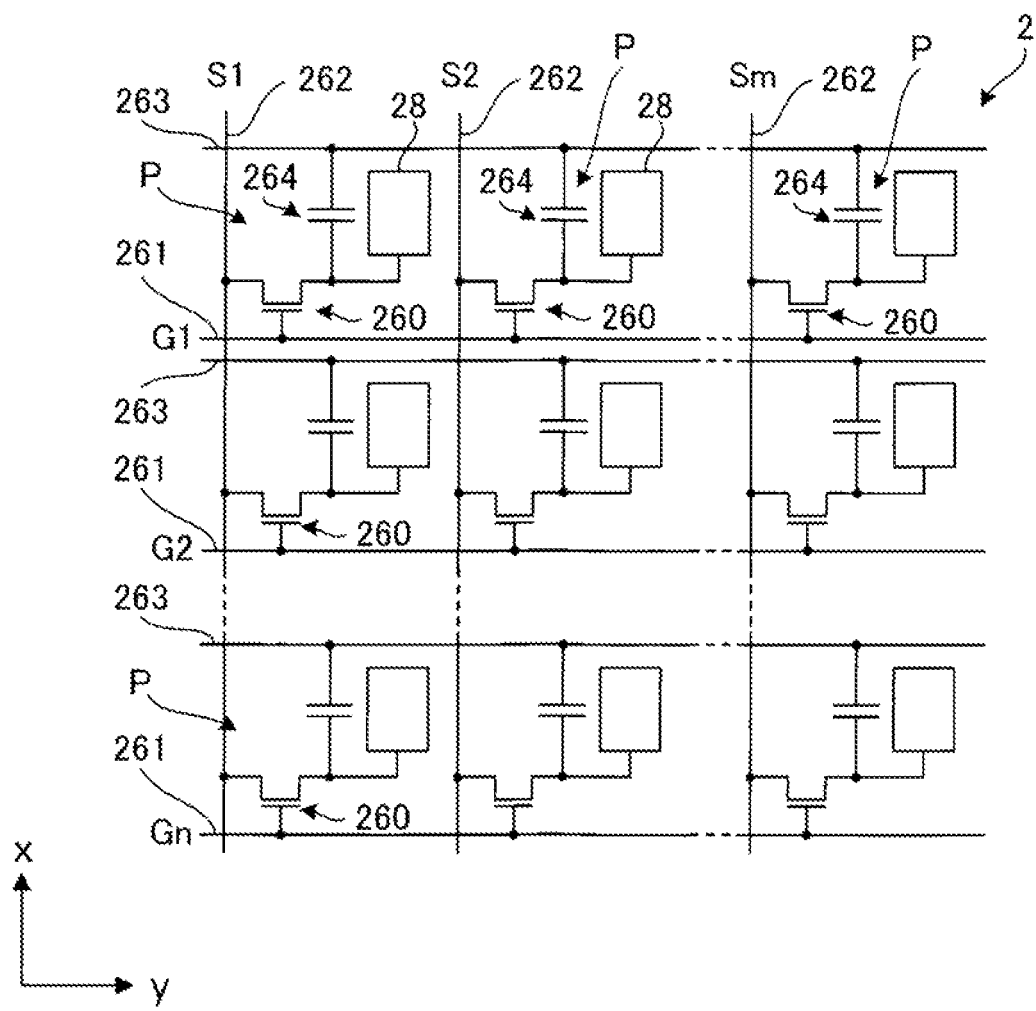
FIG. 3 is an equivalent circuit diagram illustrating an electrical configuration of an element substrate according to the first exemplary embodiment.

FIG. 3 is an equivalent circuit diagram illustrating an electrical configuration of the element substrate 2 according to the first exemplary embodiment. As illustrated in FIG. 3, n pieces of scanning lines 261, m pieces of signal lines 262, and n pieces of capacitor lines 263 are provided on the element substrate 2. Each of n and m is an integer of 2 or greater. A TFT 260 serving as a "switching element" is disposed corresponding to each of the intersections between the n pieces of scanning lines 261 and the m pieces of signal lines 262.

The n pieces of scanning lines 261 each extend in the y direction and are arranged at regular intervals in the x direction. The scanning line 261 is electrically coupled to a gate of the TFT 260. The n pieces of scanning lines 261 are electrically coupled to the scanning line driving circuit 11 illustrated in FIG. 1. Scanning signals G1, G2, . . . , and Gn are line-sequentially supplied to the n pieces of scanning lines 261 from the scanning line driving circuit 11.

The m pieces of signal lines 262 illustrated in FIG. 3 each extend in the x direction and are arranged at regular intervals in the y direction. The signal line 262 is electrically coupled to a source of the TFT 260. The m pieces of signal lines 262 are electrically coupled to the signal line driving circuit 12 illustrated in FIG. 1. Image signals S1, S2, . . . , and Sm are supplied to the m pieces of signal lines 262 in parallel from the signal line driving circuit 12 illustrated in FIG. 1.

The n pieces of scanning lines 261 and the m pieces of signal lines 262 illustrated in FIG. 3 are insulated from each other and are formed in a lattice-like pattern in plan view. A region surrounded by two adjacent scanning lines 261 and two adjacent signal lines 262 corresponds to the pixel P. In one pixel P, one pixel electrode 28 is formed. The pixel electrode 28 is electrically coupled to the TFT 260.

The n pieces of capacitor lines 263 each extend in the y direction and are arranged at regular intervals in the x direction. The n pieces of capacitor lines 263 are insulated from the plurality of signal lines 262 and the plurality of scanning lines 261, and are formed apart from these lines. A fixed potential such as a ground potential is applied to the capacitor lines 263. A storage capacitor 264 is provided in parallel to a liquid crystal capacitor, between the capacitor line 263 and the pixel electrode 28, to prevent leakage of charges held in the liquid crystal capacitor.

The scanning signals G1, G2, . . . , and Gn sequentially become active and the n pieces of scanning lines 261 are sequentially selected, then the TFT 260 coupled to the selected scanning line 261 is brought into an on-state. Then, the image signals S1, S2, . . . , and Sm having magnitudes commensurate with the grayscale to be displayed are transmitted, via the m pieces of signal lines 262, to the pixel P corresponding to the selected scanning line 261, and are then applied to the pixel electrodes 28. In this way, a voltage in accordance with the grayscale to be displayed is applied to the liquid crystal capacitor formed between the pixel electrode 28 and the counter electrode 45 included in the counter substrate 4 illustrated in FIG. 2, and the alignment of the liquid crystal molecules then varies in accordance with the applied voltage. The applied voltage is held by the storage capacitor 264. Such a variation in the alignment of the liquid crystal molecules causes the light LL to be modulated, to thus enable grayscale display.

1-1c. Specific Configuration of Electro-optical Device 100

Figure 4:
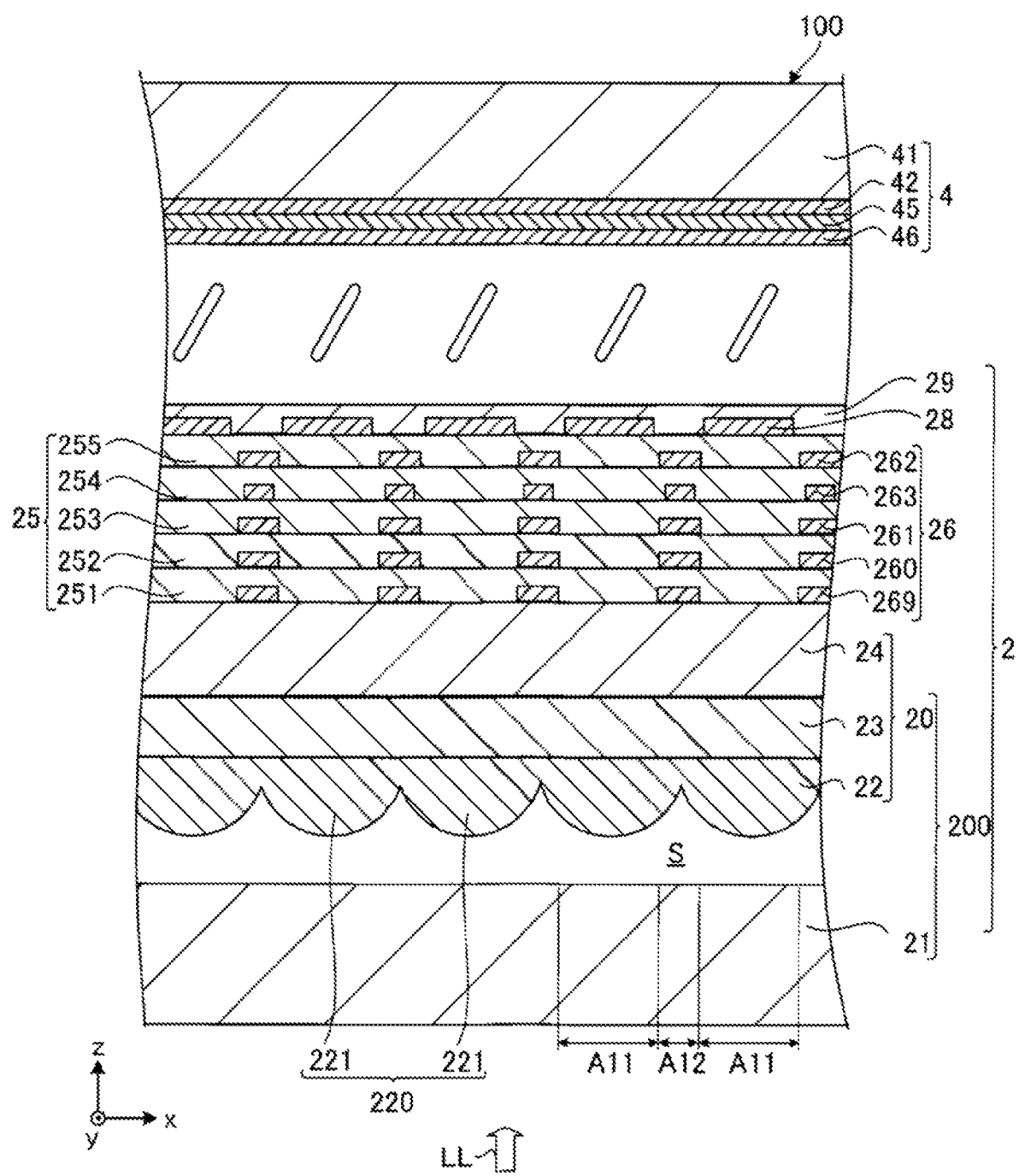
FIG. 4 is a partially enlarged view of the electro-optical device according to the first exemplary embodiment.
Figure 5:
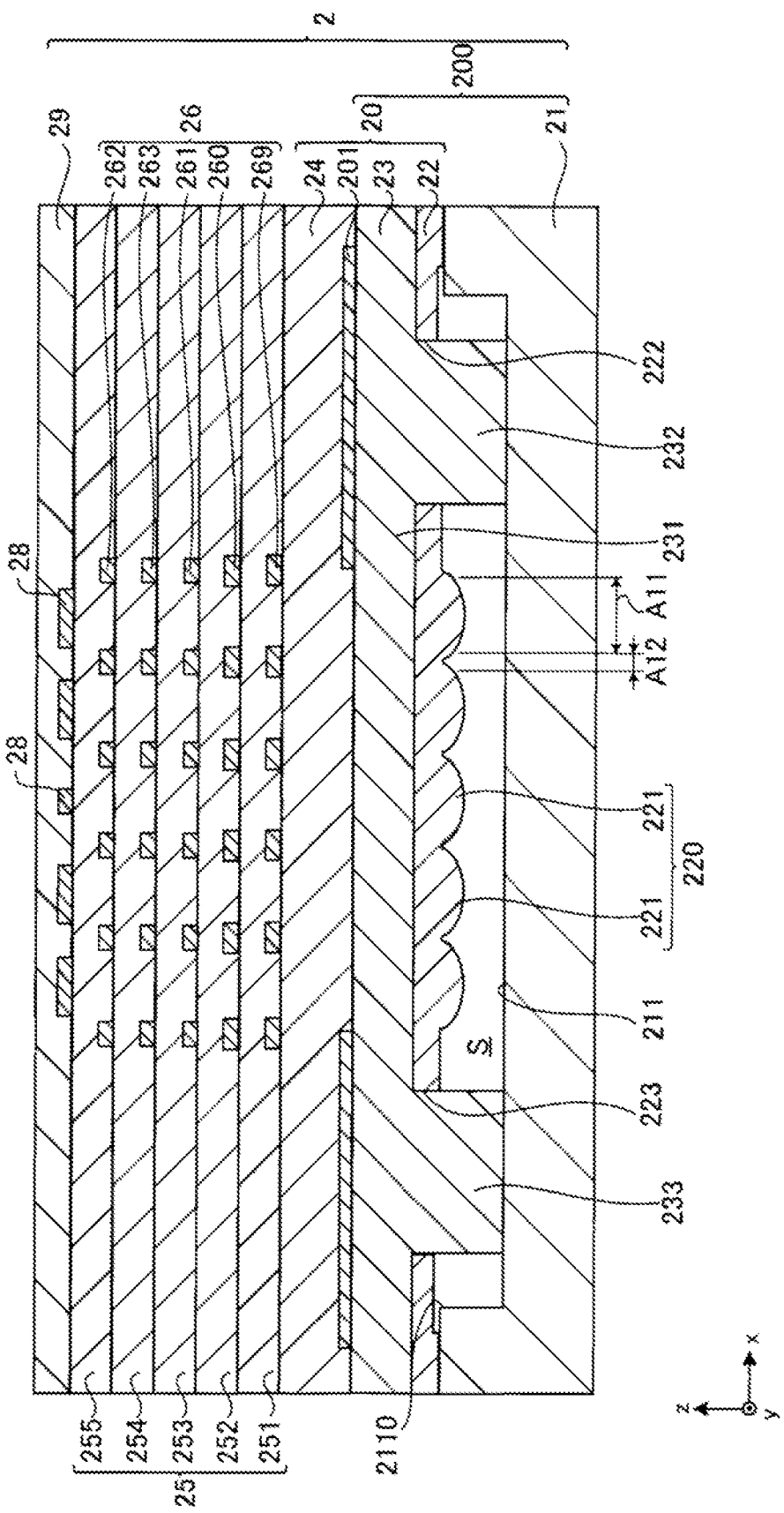
FIG. 5 is a cross-sectional view of an element substrate according to the first exemplary embodiment.
Figure 6:
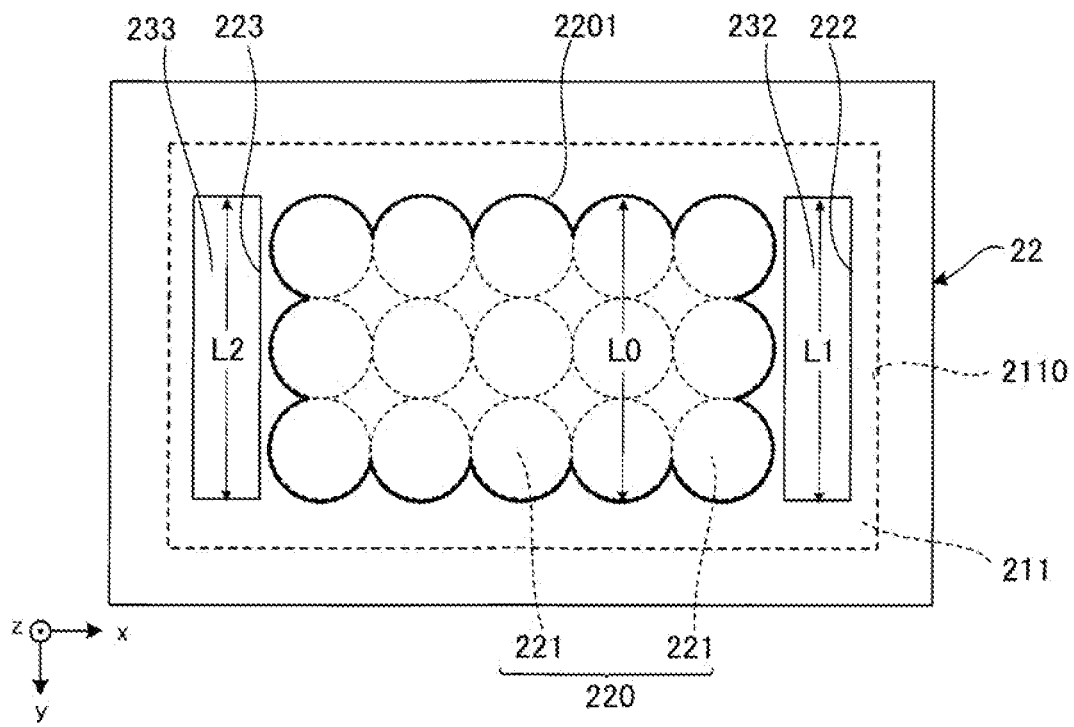
FIG. 6 is a diagram illustrating a lens layer included in a light guide portion according to the first exemplary embodiment.
Figure 7:
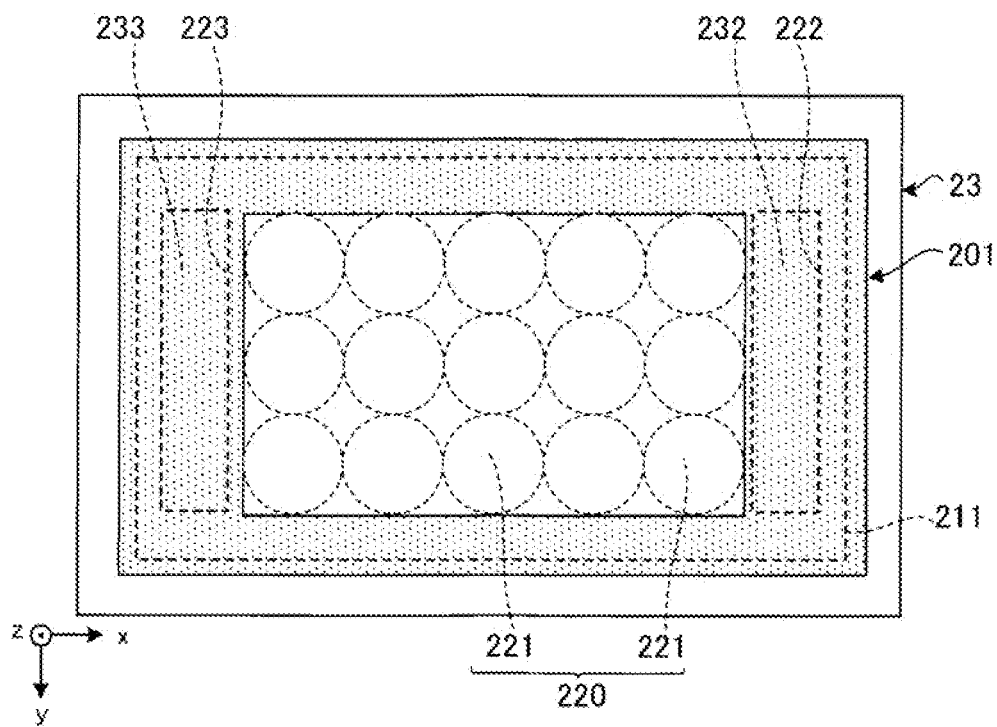
FIG. 7 is a diagram illustrating a light shielding film included in the light guide portion according to the first exemplary embodiment.

FIG. 4 is a partially enlarged view of the electro-optical device 100 according to the first exemplary embodiment, and is a partially enlarged view of a region B in FIG. 2. FIG. 5 is a cross-sectional view of the element substrate 2 according to the first exemplary embodiment. FIG. 6 is a diagram illustrating the lens layer 22 included in the light guide portion 20 according to the first exemplary embodiment. FIG. 7 is a diagram illustrating a light shielding film 201 included in the light guide portion 20 according to the first exemplary embodiment. Note that the number of lenses 221 illustrated in FIGS. 5 and 6 differs from that in the element substrate 2 in FIG. 2 for convenience of explanation.

1-1cA. Configuration of Element Substrate 2

As illustrated in FIG. 4, the element substrate 2 includes the insulating base 200, the wiring layer 26, the pixel electrode 28, and the first alignment film 29. The insulating base 200 includes the base portion 21 and the light guide portion 20.

As illustrated in FIG. 5, the base portion 21 is formed of a flat plate having translucency and insulating properties. The base portion 21 is formed of glass, quartz, or the like, for example. The base portion 21 includes a recessed portion 211. The recessed portion 211 is a recess formed in a surface on the +z side. The recessed portion 211 has a rectangular shape in plan view.

The light guide portion 20 is disposed on the base portion 21. The light guide portion 20 includes the lens layer 22 serving as a "lens portion", a first translucent layer 23 serving as a "light translucent layer", a second translucent layer 24, and the light shielding film 201.

The lens layer 22 is disposed on the base portion 21. The lens layer 22 includes a lens assembly 220 including the plurality of lenses 221. The lens 221 is formed of a convex lens that protrudes toward the base portion 21 side and has a convex curved surface. The lens 221 is hemispherical. The plurality of lenses 221 are disposed in close contact with each other. The lens assembly 220 is spaced apart from a bottom surface of the recessed portion 211. Thus, a space S is formed between the lens assembly 220 and the base portion 21. Note that a portion of the lens layer 22 outside the lens assembly 220 in plan view is in contact with the base portion 21.

As illustrated in FIG. 6, the lens assembly 220 is encompassed in the recessed portion 211 in plan view. In other words, the lens assembly 220 overlaps the recessed portion 211 in plan view, and an outer shape 2201 of the lens assembly 220 in plan view is smaller than an opening edge 2110 of the recessed portion 211. In FIG. 6, the outer shape 2201 is indicated by a thick line to facilitate understanding. Further, the plurality of lenses 221 are arranged in a matrix pattern in the x direction and the y direction in plan view. Note that the arrangement of the plurality of lenses 221 is not limited to the matrix pattern. Further, the number of lenses 221 may be the plurality of lenses 221, and is not limited to the illustrated number. Note that the outer shape 2201 of the lens assembly 220 in plan view has a longitudinal shape, which is not limited thereto, and the outer shape 2201 may have any shape. For example, the outer shape 2201 in plan view may be a circular shape, a polygonal shape other than a rectangular shape, or the like.

The lens layer 22 includes a first hole 222 serving as a "through hole" and a second hole 223 serving as a "second through hole". The lens assembly 220 is located between the first hole 222 and the second hole 223 in plan view. The first hole 222 and the second hole 223 are each spaced apart from the lens assembly 220 in plan view. Further, the first hole 222 and the second hole 223 each overlap the recessed portion 211 in plan view. As illustrated in the drawing, a length L1 along the y direction of the first hole 222 and a length L2 along the y direction of the second hole 223 are each substantially equal to a length L0 along the y direction of the lens assembly 220. Note that the length L1 and the length L2 may be longer than or shorter than the length L0. Further, the length L1 and the length L2 are substantially equal, but may be different from each other. Further, a width of the first hole 222 and a width of the second hole 223 are substantially equal, but may be different from each other. The width is a length along the x direction.

As illustrated in FIG. 5, the first translucent layer 23 is disposed at the lens layer 22. The first translucent layer 23 has translucency and insulating properties. The first translucent layer 23 includes a translucent base portion 231 having a flat plate shape, a first coupling portion 232, and a second coupling portion 233. The first coupling portion 232 is an example of a "coupling portion". The translucent base portion 231 is disposed on a surface of the lens layer 22 on the +z axis side. In other words, the lens layer 22 is disposed between the translucent base portion 231 and the base portion 21.

The first coupling portion 232 extends from a portion of the translucent base portion 231 on the −z axis side toward the base portion 21 side, and is in contact with the bottom surface of the recessed portion 211 through the first hole 222. Similarly, the second coupling portion 233 extends from a portion of the translucent base portion 231 on the −z axis side toward the base portion 21 side, and is in contact with the bottom surface of the recessed portion 211 through the second hole 223. As illustrated in FIG. 6, the lens assembly 220 is located between the first coupling portion 232 and the second coupling portion 233 in plan view. The first coupling portion 232 fills in the first hole 222. Similarly, the second coupling portion 233 fills in the second hole 223.

The first translucent layer 23 fills the first hole 222 and the second hole 223. Thus, the space S described above is an airtight space. The space S is constituted by a gas such as air, or a vacuum. Note that the space S may not be an airtight space.

As illustrated in FIG. 5, the second translucent layer 24 having a flat plate shape is disposed on the first translucent layer 23. The second translucent layer 24 has translucency and insulating properties. A shape of the second translucent layer 24 in plan view corresponds to a shape of the translucent base portion 231 in plan view. Specifically, the second translucent layer 24 has a rectangular shape in plan view.

The second translucent layer 24 adjusts an optical path length of the light LL being transmitted through the lens 221. By adjusting a thickness of the second translucent layer 24, a condensation position of the light LL by the lens 221 can be adjusted to a desired position. Note that an optical path length of the light LL may be adjusted by adjusting a refractive index of the second translucent layer 24. Further, by adjusting a thickness of the second translucent layer 24 and a thickness of the translucent base portion 231, an optical path length of the light LL may be adjusted. Further, the second translucent layer 24 may be omitted. In that case, by adjusting a thickness of the light transmission base portion 231, an optical path length of the light LL may be adjusted.

Further, the lens layer 22, the first translucent layer 23, and the second translucent layer 24, which are described above, may be each formed of a material having translucency, and, specifically, may be each formed of a silicon-based inorganic material such as silicon oxide and silicon oxynitride. The use of such an inorganic material makes it easier to form the lens layer 22 that has excellent optical properties and is also sufficiently thin as compared with when a resin material is used. Note that the same also applies to the first translucent layer 23 and the second translucent layer 24.

Further, among the silicon-based inorganic materials, each of the lens layer 22, the first translucent layer 23, and the second translucent layer 24 may be mainly formed of silicon oxide. By mainly using silicon oxide, the translucency can be increased further than that when silicon nitride is used, for example. Further, by mainly forming the second translucent layer 24 of silicon oxide, it is possible to suppress absorption of a material and the like contained in a layer other than the second translucent layer 24 by the second translucent layer 24 during manufacturing as compared with when the second translucent layer 24 is mainly formed of silicon nitride. Thus, a decrease in film quality of the second translucent layer 24 can be suppressed. Note that the same also applies to the first translucent layer 23 and the second translucent layer 24. Further, by mainly forming the lens layer 22 of silicon nitride, the lens performance can be increased as compared with when the lens layer 22 is mainly formed of silicon oxide. Further, the lens layer 22, the first translucent layer 23, and the second translucent layer 24 may be each formed of a resin material.

Further, the lens layer 22, the first translucent layer 23, and the second translucent layer 24 may be formed of materials different from each other, but may be formed of the same material. Interfacial reflection and the like can be suppressed by forming them of the same material as compared with when they are formed of materials different from each other.

The light shielding film 201 having light shielding properties is disposed between the first translucent layer 23 and the second translucent layer 24. The "light shielding properties" refer to light blocking properties to visible light, and specifically means that a transmittance of visible light is less than or equal to 10% and may be less than or equal to 5%. The light shielding film 201 is formed of a metal or a metal compound, for example. As illustrated in FIG. 7, the light shielding film 201 has a rectangular frame shape in plan view. Note that, in FIG. 7, dots are drawn on the light shielding film 201 to facilitate understanding. The light shielding film 201 surrounds the lens assembly 220 in plan view. Further, the light shielding film 201 overlaps the first hole 222 and the second hole 223 in plan view. Thus, the light shielding film 201 overlaps the first coupling portion 232 and the second coupling portion 233 in plan view. Note that a shape of the light shielding film 201 in plan view is not limited to the illustrated rectangular frame shape. Further, in the present exemplary embodiment, the light shielding film 201 does not overlap the lens assembly 220 in plan view, but a part of the light shielding film 201 may overlap the lens assembly 220 in plan view.

As illustrated in FIG. 5, the wiring layer 26 is disposed on the second translucent layer 24. The wiring layer 26 includes a light shielding layer 269, the TFT 260, various wiring lines such as the scanning line 261, the capacitor line 263, and the signal line 262, and an insulator 25. Note that the order of the TFT 260, the scanning line 261, the capacitor line 263, and the signal line 262 illustrated in FIG. 5 is an example, and the order thereof is not limited to the illustrated example. Further, as described above, the signal line 262 extends in the x direction, but, in FIG. 5, the arrangement of the signal lines 262 differs from the actual arrangement to facilitate understanding. Further, in FIG. 5, various wiring lines such as a capacitance 64, and the like are omitted. The same also applies to FIG. 4.

The insulator 25 has translucency and insulating properties. The insulator 25 includes a first interlayer insulating film 251, a second interlayer insulating film 252, a third interlayer insulating film 253, a fourth interlayer insulating film 254, and a fifth interlayer insulating film 255. The first interlayer insulating film 251 is disposed on the second translucent layer 24, and is located between the light shielding layer 269 having light shielding properties and the TFT 260. The second interlayer insulating film 252 is disposed on the first interlayer insulating film 251, and is located between the TFT 260 and the scanning line 261. The third interlayer insulating film 253 is disposed on the second interlayer insulating film 252, and is located between the scanning line 261 and the capacitor line 263. The fourth interlayer insulating film 254 is disposed on the third interlayer insulating film 253, and is disposed between the capacitor line 263 and the signal line 262. The fifth interlayer insulating film 255 is disposed on the fourth interlayer insulating film 254, and covers the signal line 262.

The TFT 260, various wiring lines such as the scanning line 261, the capacitor line 263, and the signal line 262, and the light shielding layer 269 are each formed of a metal, a metal compound, or the like, for example. Further, each layer included in the insulator 25 is formed of a silicon-based inorganic material such as silicon oxide, for example. Although not illustrated in the drawings, a layer formed of a silicon-based inorganic material having, for example, translucency and insulating properties may be disposed between the base portion 21 and the insulator 25.

The wiring layer 26 includes a plurality of light transmission regions A11 through which the light LL is transmitted, and a wiring region A12 in which various wiring lines are disposed. The light transmission region A11 has a substantially rectangular shape in plan view. The plurality of light transmission regions A11 are arranged in a matrix pattern in plan view. Further, the wiring region A12 blocks the light LL. The wiring region A12 has a lattice-like pattern in plan view. The wiring region A12 surrounds the light transmission region A11 in plan view.

The plurality of pixel electrodes 28 are disposed on the wiring layer 26. One pixel electrode 28 and one light transmission region A11 overlap each other in plan view. One pixel electrode 28 and one light transmission region A11 are provided for one pixel P.

As described above, the element substrate 2 includes the insulating base 200 having translucency and insulating properties, the pixel electrode 28 spaced apart from the insulating base 200, and the TFT 260 electrically coupled to the pixel electrode 28. Further, the insulating base 200 includes the base portion 21, and the lens layer 22 that is located between the base portion 21 and the pixel electrode 28 and includes the lens 221 overlapping the pixel electrode 28 in plan view when viewed from a thickness direction of the pixel electrode 28. The space S is provided between the base portion 21 and the lens 221. By providing the space S, as compared with when the lens assembly 220 is in contact with the base portion 21, the lens performance can be increased. The reason is that a difference in refractive index between the lens layer 22 and the space S is greater than a difference in refractive index between the lens layer 22 and the base portion 21. Further, since the space S is provided, a refractive index difference between the lens 221 and the space S can be sufficiently increased without increasing a refractive index of the lens layer 22 as in the related art. Thus, a decrease in heat resistance of the lens layer 22 to annealing treatment during formation of the TFT 260 is suppressed. Furthermore, a decrease in translucency of the lens layer 22 can be prevented by increasing a refractive index of the lens layer 22.

Further, as described above, the lens layer 22 is provided with the first hole 222 serving as a "through hole" that communicates with the space S, and the second hole 223 that communicates with the space S. The insulating base 200 is disposed at the lens layer 22, and further includes the first translucent layer 23 serving as a "translucent layer" having translucency and insulating properties that fills the first hole 222. By providing the first translucent layer 23 that fills the first hole 222 and the second hole 223, the element substrate 2 having excellent lens performance can be manufactured with ease and high precision. Note that a manufacturing method will be described below in detail. Further, by providing the first translucent layer 23, a state in the space S can be suitably maintained. Note that the arrangement of the first hole 222 is not limited to the illustrated example, and any arrangement can be used. The same also applies to the second hole 223.

As described above, the first translucent layer 23 includes the first coupling portion 232 coupled to the base portion 21 through the first hole 222. Similarly, in the present exemplary embodiment, the first translucent layer 23 includes the second coupling portion 233 coupled to the base portion 21 through the second hole 223. By providing the first coupling portion 232, the first hole 222 can be suitably filled. Similarly, by providing the second coupling portion 233, the second hole 223 can be suitably filled. Thus, by providing the first coupling portion 232 and the second coupling portion 233, a state in the space S is more easily maintained than when the first coupling portion 232 and the second coupling portion 233 are not provided. Note that the first translucent layer 23 may be formed of only the translucent base portion 231. In other words, the first translucent layer 23 may not include the first coupling portion 232 and the second coupling portion 233.

As described above, in the present exemplary embodiment, the light LL is transmitted from the base portion 21 toward the pixel electrode 28. In other words, the convex lens surface of the lens 221 functions as an incident surface for causing the light LL to be incident on the lens 221 from the space S. The incidence of the light LL on the lens 221 from the space S can refract the light LL so as to effectively converge the light LL. Thus, the light LL can be less likely to be applied to a semiconductor layer included in the TFT 260, for example, and utilization efficiency of the light LL can be particularly increased.

1-1cB. Configuration of Counter Substrate 4

As illustrated in FIG. 4, the counter substrate 4 includes the base 41, the insulating layer 42, the counter electrode 45, and the second alignment film 46. In the present exemplary embodiment, the counter substrate 4 does not include an optical member that converges or diverges the light LL. Since the electro-optical device 100 includes the element substrate 2 including the insulating base 200 described above, the utilization efficiency of the light LL can be sufficiently increased even when the element substrate 2 does not include an optical member. Further, since the counter substrate 4 does not include an optical member, the electro-optical device 100 can be made thinner than when a lens member is provided.

Note that the counter substrate 4 may include an optical member that converges or diverges the light LL.

1-1d. Method for Manufacturing Electro-optical Device 100

Figure 8:
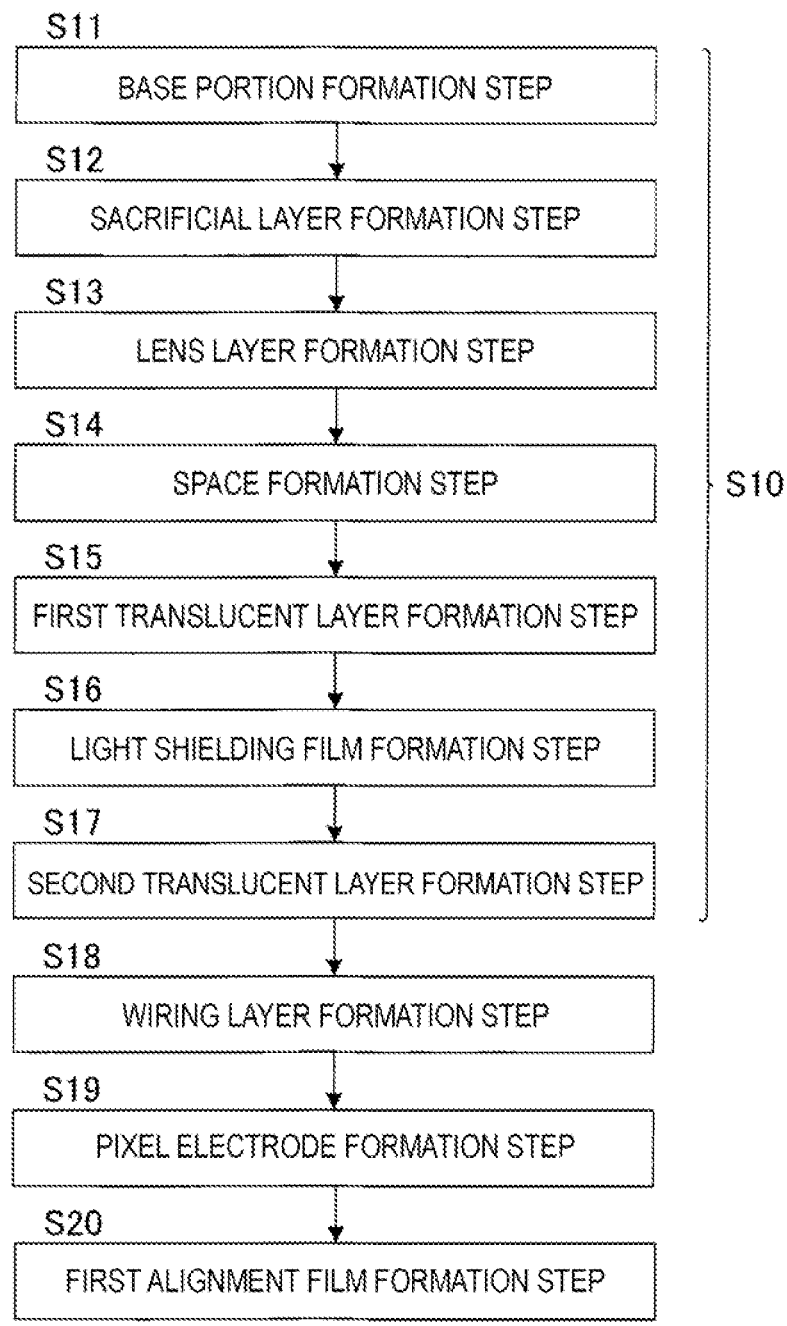
FIG. 8 is a flow illustrating a method for manufacturing the element substrate according to the first exemplary embodiment.

Next, a method for manufacturing the electro-optical device 100 will be described. First, a method for manufacturing the element substrate 2 included in the electro-optical device 100 will be described. FIG. 8 is a flow illustrating the method for manufacturing the element substrate 2 according to the first exemplary embodiment. As illustrated in FIG. 8, the method for manufacturing the element substrate 2 includes an insulating base formation step S10, a wiring line layer formation step S18, a pixel electrode formation step S19, and a first alignment film formation step S20. The insulating base formation step S10 includes a base portion formation step S11, a sacrificial layer formation step S12, a lens layer formation step S13, a space formation step S14, a first translucent layer formation step S15, a light shielding film formation step S16, and a second translucent layer formation step S17.

Figure 9:
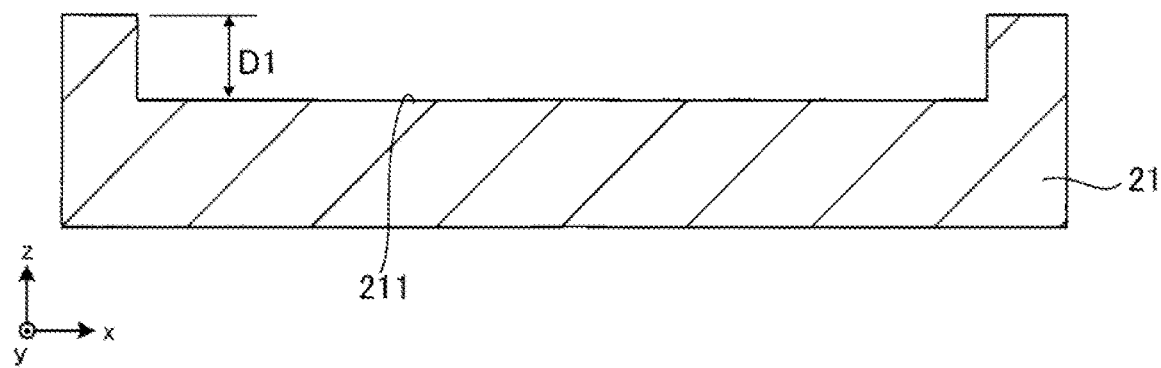
FIG. 9 is a cross-sectional view illustrating a base portion formation step according to the first embodiment.
Figure 10:
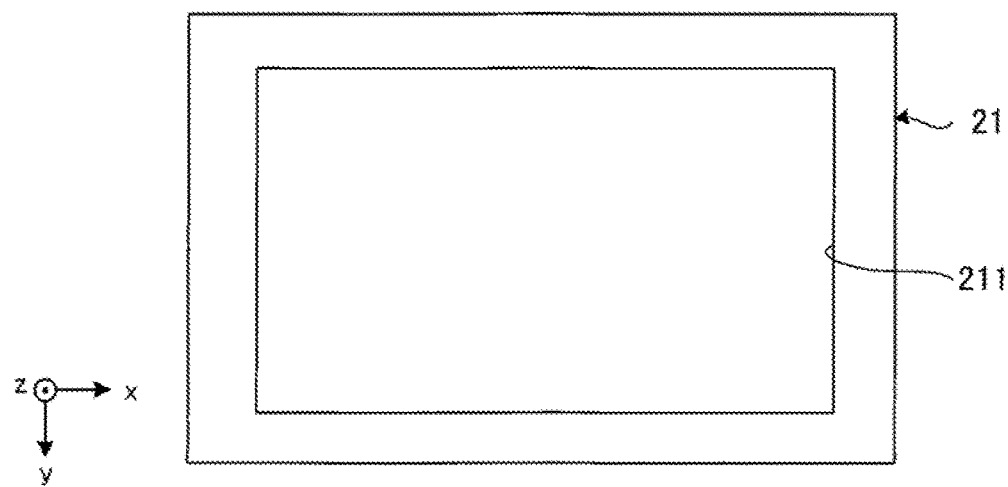
FIG. 10 is a plan view illustrating the base portion formation step according to the first exemplary embodiment.

FIG. 9 is a cross-sectional view illustrating the base portion formation step S11 according to the first exemplary embodiment. In the base portion formation step S11, the base portion 21 illustrated in FIG. 9 is formed by forming the recessed portion 211 in a quartz substrate, for example. The formation of the recessed portion 211 is performed by dry etching or wet etching, for example. Further, the recessed portion 211 is formed such that a depth D1 of the recessed portion 211 is greater than a thickness D2 of the lens 221 illustrated in FIG. 15, which will be described later. FIG. 10 is a plan view illustrating the base portion formation step according to the first exemplary embodiment. As illustrated in FIG. 10, the recessed portion 211 in the base portion 21 is formed in a rectangular shape in plan view, for example. Note that a shape of the recessed portion 211 in plan view is not limited to the illustrated shape.

Figure 11:
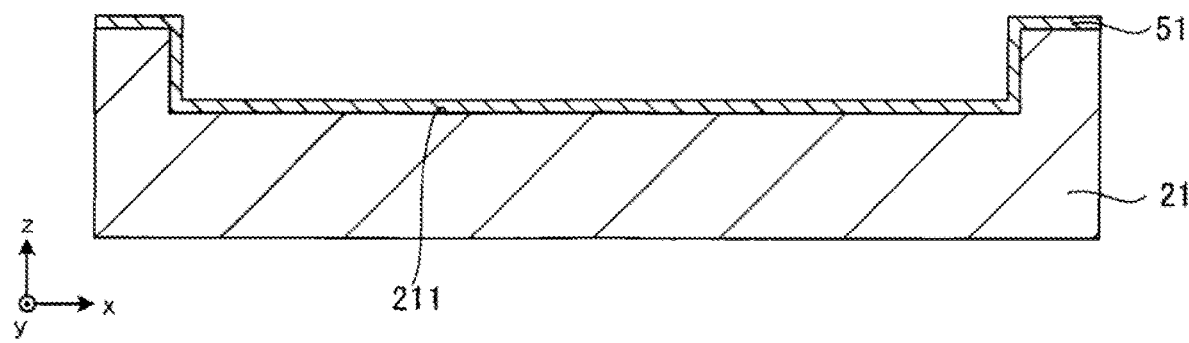
FIG. 11 is a cross-sectional view illustrating a sacrificial layer formation step according to the first exemplary embodiment.
Figure 12:
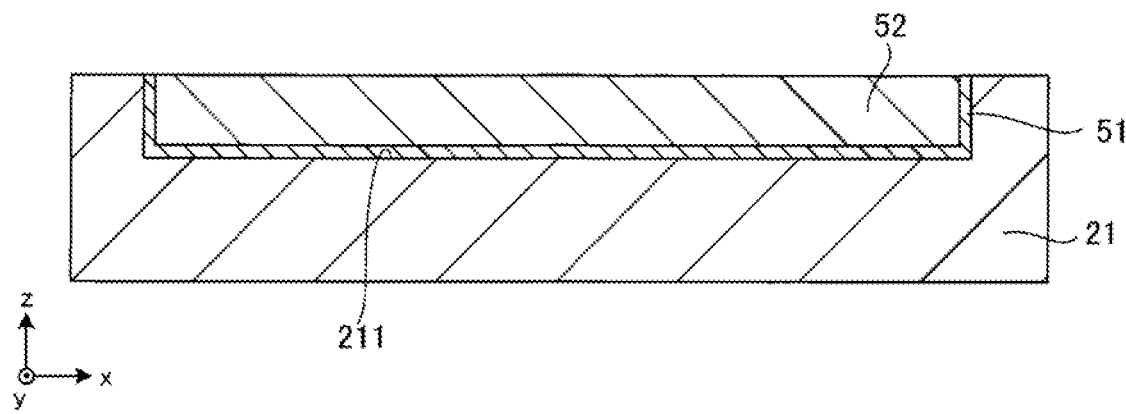
FIG. 12 is a cross-sectional view illustrating the sacrificial layer formation step according to the first exemplary embodiment.
Figure 13:
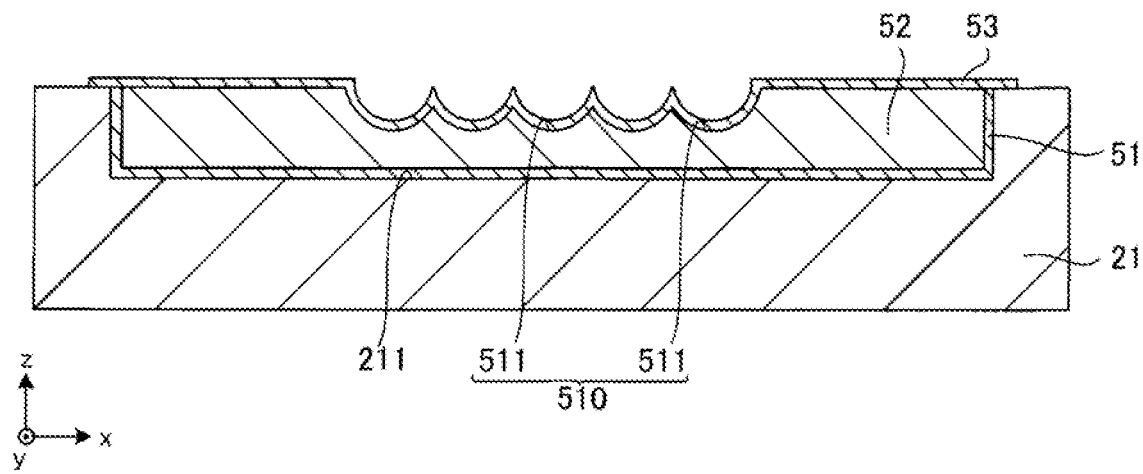
FIG. 13 is a cross-sectional view illustrating the sacrificial layer formation step according to the first exemplary embodiment.
Figure 14:
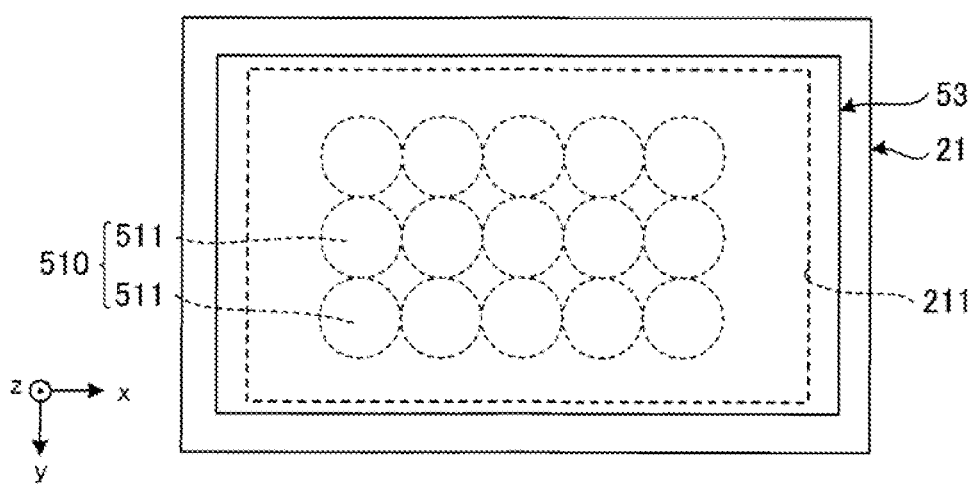
FIG. 14 is a plan view illustrating the sacrificial layer formation step according to the first exemplary embodiment.

FIGS. 11 to 13 are each a cross-sectional view illustrating the sacrificial layer formation step S12 according to the first exemplary embodiment. FIG. 14 is a plan view illustrating the sacrificial layer formation step S12 according to the first exemplary embodiment. In the sacrificial layer formation step S12, first, as illustrated in FIG. 11, a first sacrificial layer 51 is formed on the base portion 21. The first sacrificial layer 51 is formed so as to cover a surface of the base portion 21 on the +z axis side where the recessed portion 211 is formed. The first sacrificial layer 51 is formed by a vapor deposition method such as a chemical vapor deposition (CVD) method, for example. The first sacrificial layer 51 contains silicon, for example.

Next, as illustrated in FIG. 12, a second sacrificial layer 52 is formed on the first sacrificial layer 51, and then planarization processing is performed on a surface of each of the first sacrificial layer 51 and the second sacrificial layer 52 on the +z axis side. The second sacrificial layer 52 is formed by a vapor deposition method such as a CVD method, for example. Examples of the planarization processing include polishing processing such as a chemical mechanical polishing (CMP) method, for example. The second sacrificial layer 52 contains silicon oxide, for example. The second sacrificial layer 52 may be formed of a material different from that of the first sacrificial layer 51.

Next, as illustrated in FIG. 13, a recessed lens group 510 is formed on the surface of the second sacrificial layer 52 on the +z axis side. Subsequently, a third sacrificial layer 53 is formed on the second sacrificial layer 52. The recessed lens group 510 includes a plurality of lens recessed portions 511. The lens recessed portion 511 is a recess formed in the second sacrificial layer 52 to form the lens 221. The lens recessed portion 511 is hemispherical. As illustrated in FIG. 14, the plurality of lens recessed portions 511 are arranged in a matrix pattern in the x direction and the y direction in plan view. Further, the plurality of lens recessed portions 511 overlap the recessed portion 211 in plan view. The formation of the plurality of lens recessed portions 511 is performed by etching, for example. As illustrated in FIG. 13, the third sacrificial layer 53 is formed so as to cover the recessed lens group 510. The third sacrificial layer 53 is formed by a vapor deposition method such as a CVD method, for example. The third sacrificial layer 53 contains silicon, for example. The third sacrificial layer 53 may be formed of the same material as that of the first sacrificial layer 51.

Figure 15:
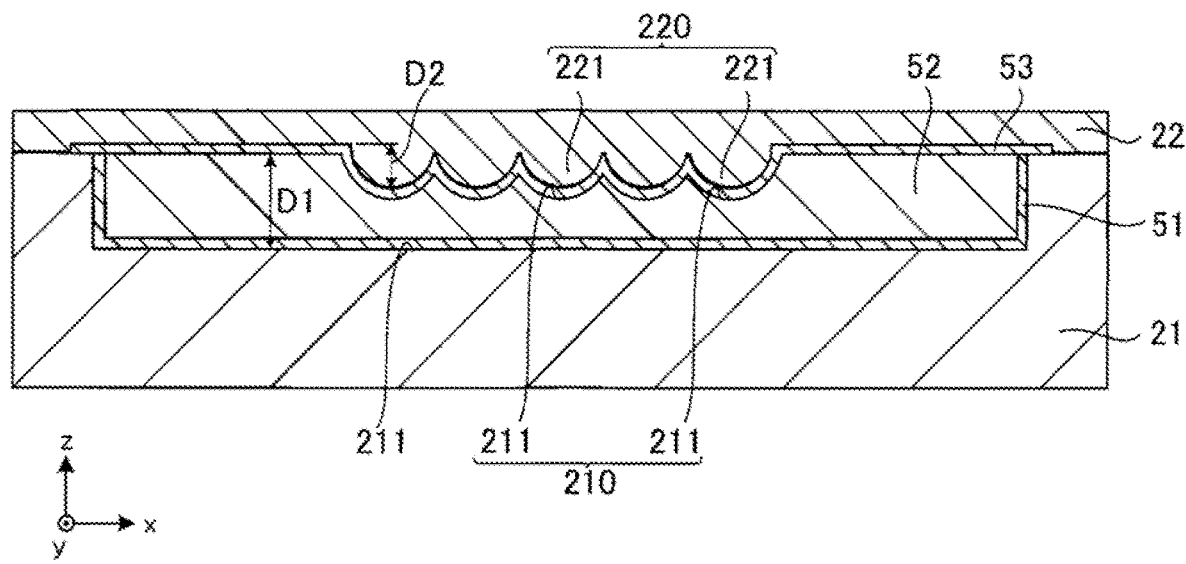
FIG. 15 is a cross-sectional view illustrating a lens layer formation step according to the first exemplary embodiment.
Figure 16:
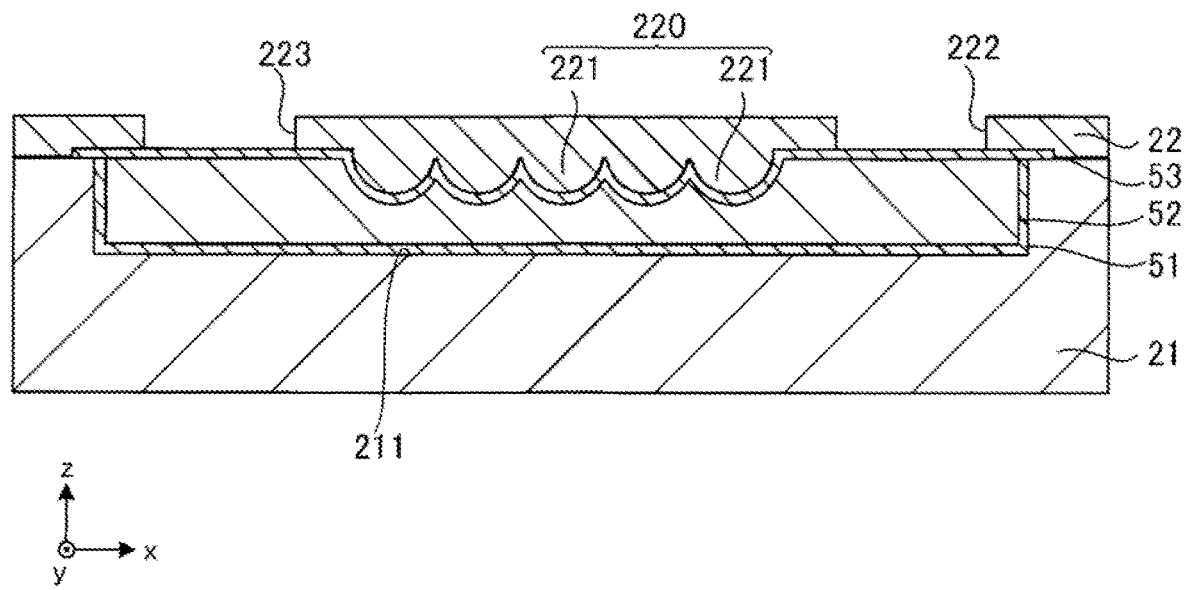
FIG. 16 is a cross-sectional view illustrating the lens layer formation step according to the first exemplary embodiment.

FIGS. 15 and 16 are each a cross-sectional view illustrating the lens layer formation step S13 according to the first exemplary embodiment. In the lens layer formation step S13, first, as illustrated in FIG. 15, the lens layer 22 including the lens assembly 220 including the plurality of lenses 221 is formed on the third sacrificial layer 53. The lens layer 22 contains silicon oxide and the like, for example. The lens layer 22 is formed by a vapor deposition method such as a CVD method, for example. Next, as illustrated in FIG. 16, the first hole 222 and the second hole 223 are formed in the lens layer 22. The formation of each of the first hole 222 and the second hole 223 is performed by etching, for example. The first hole 222 and the second hole 223 are formed such that the lens assembly 220 is located therebetween in plan view.

Figure 17:
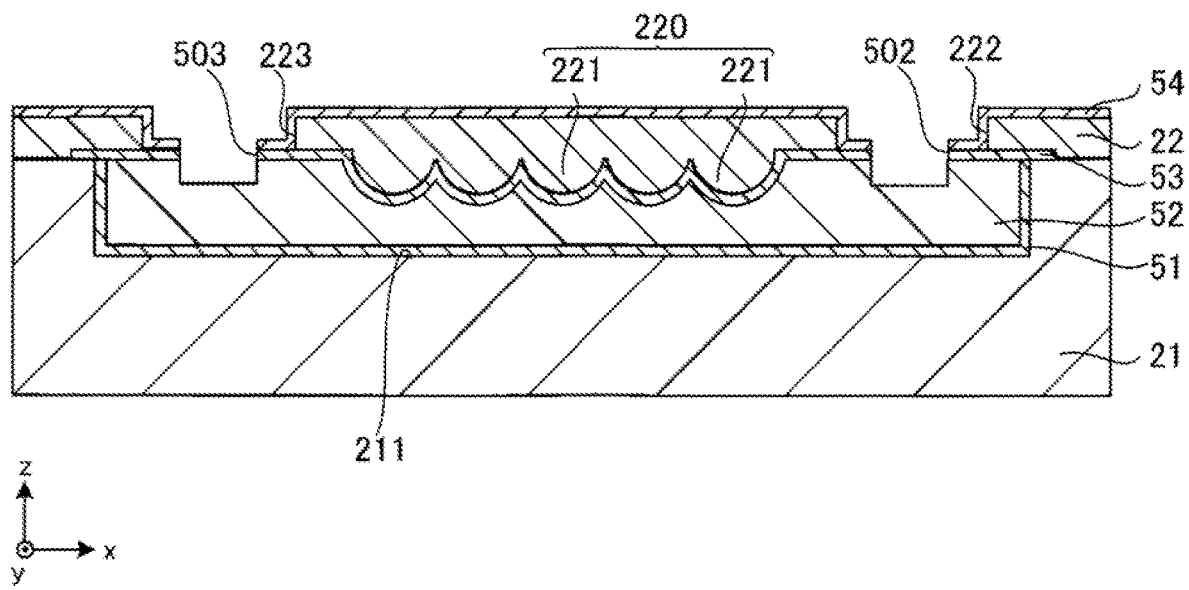
FIG. 17 is a cross-sectional view illustrating a space formation step according to the first exemplary embodiment.
Figure 18:
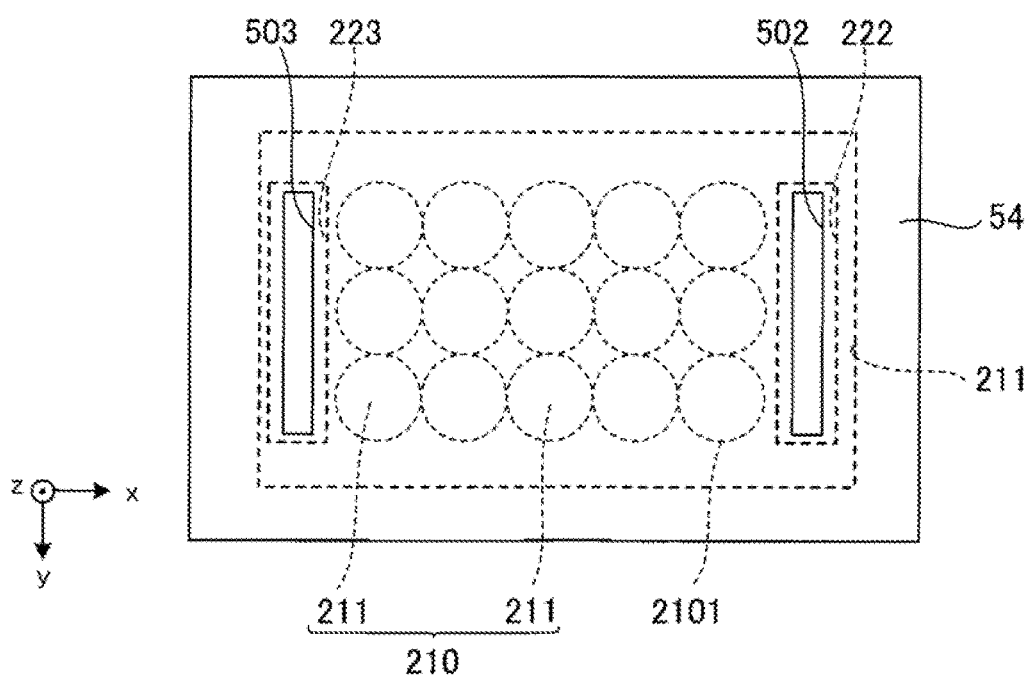
FIG. 18 is a plan view illustrating the space formation step according to the first exemplary embodiment.
Figure 19:
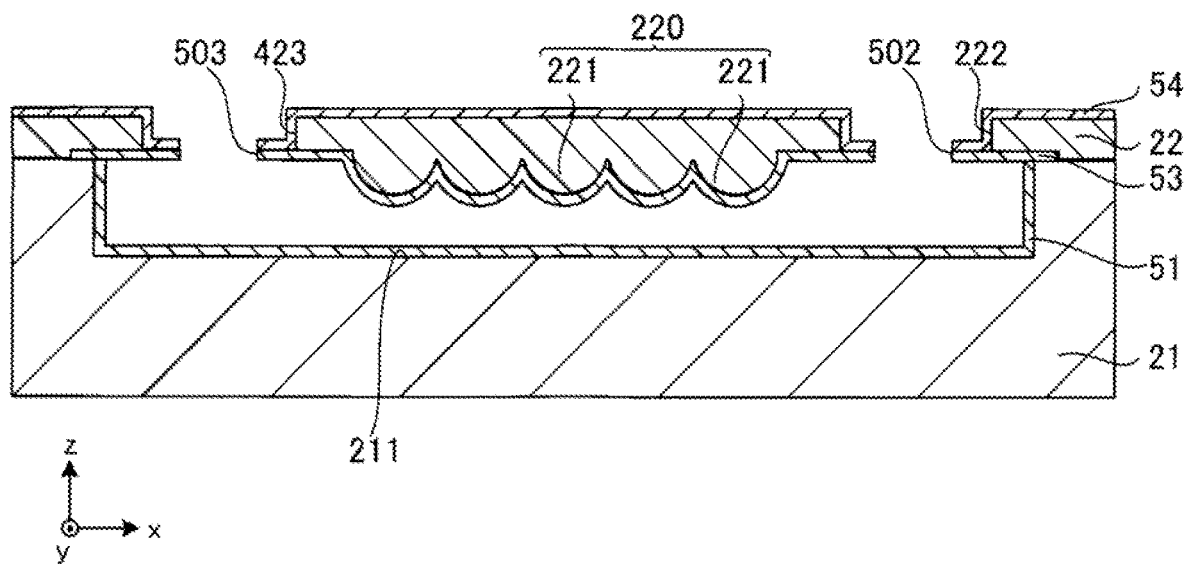
FIG. 19 is a cross-sectional view illustrating the space formation step according to the first exemplary embodiment.
Figure 20:
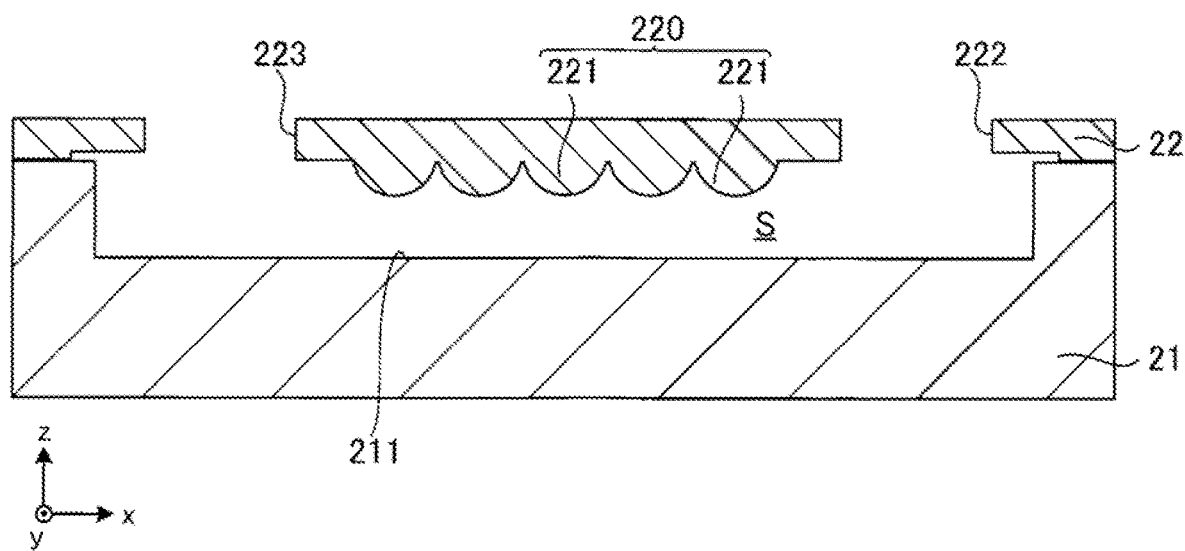
FIG. 20 is a cross-sectional view illustrating the space formation step according to the first exemplary embodiment.

FIGS. 17, 19, and 20 are each a cross-sectional view illustrating the space formation step S14 according to the first exemplary embodiment. FIG. 18 is a plan view illustrating the space formation step S14 according to the first exemplary embodiment. In the space formation step S14, first, as illustrated in FIG. 17, a fourth sacrificial layer 54 is formed on the lens layer 22. Subsequently, a first space hole 502 and a second space hole 503 are formed. The fourth sacrificial layer 54 is formed by a vapor deposition method such as a CVD method, for example. The fourth sacrificial layer 54 contains silicon, for example. The fourth sacrificial layer 54 may be formed of the same material as that of the third sacrificial layer 53.

The first space hole 502 and the second space hole 503 are each formed by removing a part of the fourth sacrificial layer 54 and a part of the third sacrificial layer 53. Note that, in the illustration, a part of the second sacrificial layer 52 is also removed during the removal. By setting the constituent material of the fourth sacrificial layer 54 to be the same as the constituent material of the third sacrificial layer 53, the fourth sacrificial layer 54 and the third sacrificial layer 53 can be removed collectively. Further, as illustrated in FIG. 18, the first space hole 502 is encompassed in the first hole 222 in plan view. In other words, the first space hole 502 overlaps the first hole 222 in plan view, and a planar area of the first space hole 502 is larger than a planar area of the first hole 222. Similarly, the second space hole 503 is encompassed in the second hole 223 in plan view. In other words, the second space hole 503 overlaps the second hole 223 in plan view, and a planar area of the second space hole 503 is larger than a planar area of the second hole 223.

Next, as illustrated in FIG. 19, the second sacrificial layer 52 is removed by etching by using the first hole 222, the second hole 223, the first space hole 502, and the second space hole 503. In order to remove the second sacrificial layer 52, processing by gas and the like having a high selection ratio to the first sacrificial layer 51 and the third sacrificial layer 53, which will be described later, is beneficial. For example, when the second sacrificial layer 52 is formed of silicon oxide, gas etching using a fluorine-based etching gas such as hydrogen fluoride (HF) or wet etching using a fluorine-based etchant such as hydrogen fluoride (HF) may be used. Further, during the etching, the first sacrificial layer 51, the third sacrificial layer 53, and the fourth sacrificial layer 54 function as a protective layer for protecting the base portion 21 and the lens layer 22. In order to suitably exhibit the function as the protective layer, a constituent material of each of the first sacrificial layer 51, the third sacrificial layer 53, and the fourth sacrificial layer 54 may be different from a constituent material of the second sacrificial layer 52. Particularly, an etching rate of the first sacrificial layer 51 for the etching gas used for removing the second sacrificial layer 52 may be slower than an etching rate of the second sacrificial layer 52 for the etching gas. The same also applies to the third sacrificial layer 53 and the fourth sacrificial layer 54.

Next, as illustrated in FIG. 20, the first sacrificial layer 51, the third sacrificial layer 53, and the fourth sacrificial layer 54 are removed by etching by using the first hole 422 and the second hole 423. As a result, the space S is formed between the lens assembly 220 and the base portion 21. For example, when the second sacrificial layer 52 is formed of silicon, dry etching using a fluorine gas such as sulfur hexafluoride ($SF_6$), wet etching using hydrofluoric acid or the like, or gas etching using a fluorine-based gas such as chlorine trifluoride ($ClF_3$) may be used. Further, by setting a constituent material of the first sacrificial layer 51, a constituent material of the third sacrificial layer 53, and a constituent material of the fourth sacrificial layer 54 to be the same, the fourth sacrificial layer 54 and the third sacrificial layer 53 can be removed collectively. Note that the gas etching is etching by simply supplying gas. Further, the dry etching includes plasma etching, ion beam etching, and the like, and does not include gas etching.

Figure 21:
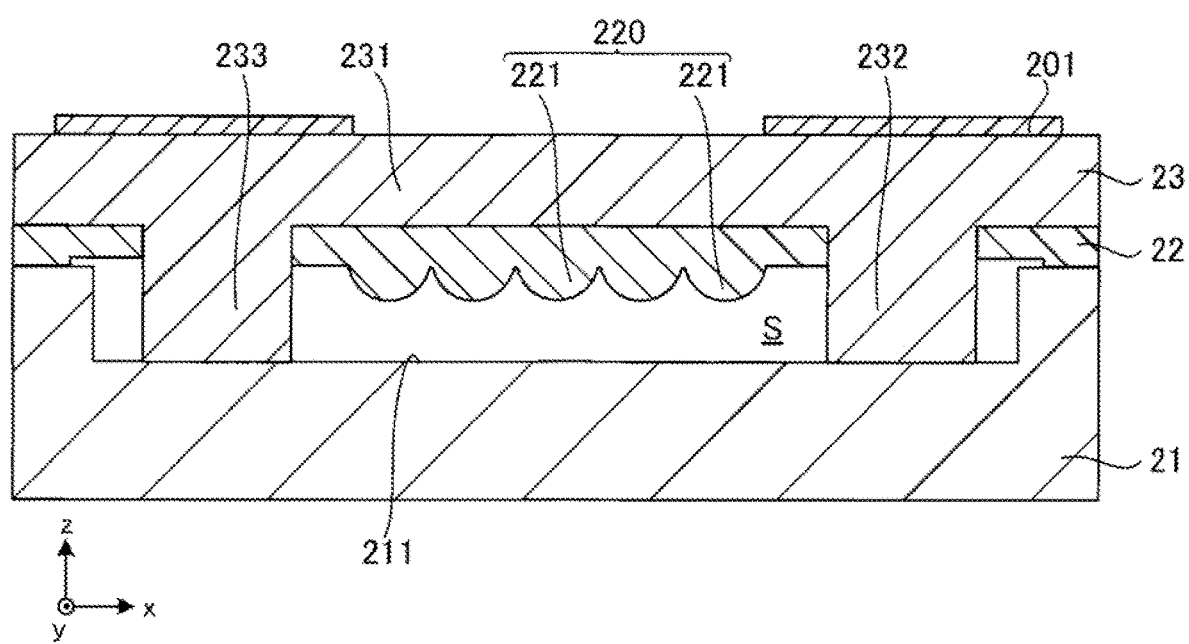
FIG. 21 is a cross-sectional view illustrating a first translucent layer formation step and a light shielding film formation step according to the first exemplary embodiment.

FIG. 21 is a cross-sectional view illustrating the first translucent layer formation step S15 and the light shielding film formation step S16 according to the first exemplary embodiment. In the first translucent layer formation step S15, the first translucent layer 23 is formed on the lens layer 22. The first translucent layer 23 is formed by forming a translucent film containing, for example, silicon oxide and the like by a vapor deposition method such as a CVD method, for example, and by performing planarization processing on the translucent film by polishing processing such as a CMP method. When the first translucent layer 23 is formed, the first coupling portion 232 is also formed, and the second coupling portion 233 is formed. The first coupling portion 232 contacts the base portion 21 through the first hole 222. The second coupling portion 233 contacts the base portion 21 through the second hole 223.

Next, in the light shielding film formation step S16, the light shielding film 201 is formed on the first translucent layer 23. The light shielding film 201 is formed so as to surround the lens assembly 220 in plan view. The light shielding film 201 is formed by forming a layer containing a metal or a metal compound, for example, by a vapor deposition method such as a CVD method, and then patterning the layer by using a mask.

Next, in the second translucent layer formation step S17, although not illustrated, the second translucent layer 24 that covers the light shielding film 201 is formed on the first translucent layer 23. The second translucent layer 24 contains silicon oxide, for example. The second translucent layer 24 is formed by forming a translucent film by a vapor deposition method such as a CVD method, for example, and by performing planarization processing on the translucent film by polishing processing such as a CMP method.

Next, in the wiring layer formation step S18, although not illustrated, the light shielding layer 269, the TFT 260, various wiring lines such as the scanning line 261, the capacitor line 263, and the signal line 262, and the insulator 25 are formed. Specifically, the light shielding layer 269 and various wiring lines are each formed by forming a metal film by, for example, a sputtering method or a vapor deposition method, and then performing etching using a resist mask on the metal film. Each of the layers included in the insulator 25 is formed by using a vapor deposition method such as CVD method and planarization processing by polishing and the like, such as CMP.

Next, in the pixel electrode formation step S19, although not illustrated, the plurality of pixel electrodes 28 are formed on the wiring layer 26. Specifically, the pixel electrode 28 is formed by forming a layer formed of a transparent electrode material, for example, by a vapor deposition method such as a CVD method, and then patterning the layer by using a mask.

Next, in the first alignment film formation step S20, the first alignment film 29 is formed by forming a layer formed of, for example, polyimide by a vapor deposition method such as a CVD method, and then performing rubbing treatment on the layer. As described above, the element substrate 2 illustrated in FIG. 5 is formed.

Note that various circuits, such as the scanning line driving circuit 11 illustrated in FIG. 1, and the like are appropriately formed in the step described above or between the steps. Further, for example, the counter substrate 4 is formed by using a known technique as appropriate, and the element substrate 2 and the counter substrate 4 are bonded together via the sealing member 8. Subsequently, the liquid crystal material is injected between the element substrate 2, the counter substrate 4, and the sealing member 8 to form the liquid crystal layer 9, and then sealed. In this way, the electro-optical device 100 illustrated in FIGS. 1 and 2 can be manufactured.

As described above, the method for manufacturing the electro-optical device 100 includes the insulating base formation step S10, the wiring layer formation step S18, and the pixel electrode formation step S19. In the insulating base formation step S10, the insulating base 200 having translucency and insulating properties is formed. In the wiring layer formation step S18, the TFT 260 is formed. In the pixel electrode formation step S19, the pixel electrode 28 electrically coupled to the TFT 260 is formed. Further, the insulating base formation step S10 includes the base portion formation step S11, the lens layer formation step S13, and the space formation step S14. In other words, in the insulating base formation step S10, the base portion 21, and the lens layer 22 that is located between the base portion 21 and the pixel electrode 28 and includes the lens 221 overlapping the pixel electrode 28 in plan view when viewed from a thickness direction of the pixel electrode 28 are formed. The space S is provided between the base portion 21 and the lens 221. Since the space S is provided between the base portion 21 and the lens 221, the manufacturing method can sufficiently increase a refractive index difference between the lens 221 and the space S without increasing a refractive index of the lens layer 22 as in the related art. Thus, a decrease in heat resistance to the annealing treatment during the formation of the TFT 260 is suppressed. Furthermore, a decrease in translucency of the lens layer 22 can be prevented by increasing a refractive index of the lens layer 22.

As described above, the first translucent layer 23 includes the first coupling portion 232 coupled to the base portion 21 through the first hole 222. Similarly, in the present exemplary embodiment, the first translucent layer 23 includes the second coupling portion 233 coupled to the base portion 21 through the second hole 223. By providing the first translucent layer 23 with the first coupling portion 232 and the second coupling portion 233, bending of the lens layer 22 can be suppressed during manufacturing of the second translucent layer 24 and the like as compared with when the first translucent layer 23 is formed of only the translucent base portion 231.

The lens layer 22 is provided with the second hole 223 serving as a "second through hole" that communicates with the space S. Etching efficiency can be increased by further providing the second hole 223 in addition to the first hole 222. Thus, the space formation step S14 can be performed more quickly.

1-2. Second Exemplary Embodiment

Figure 22:
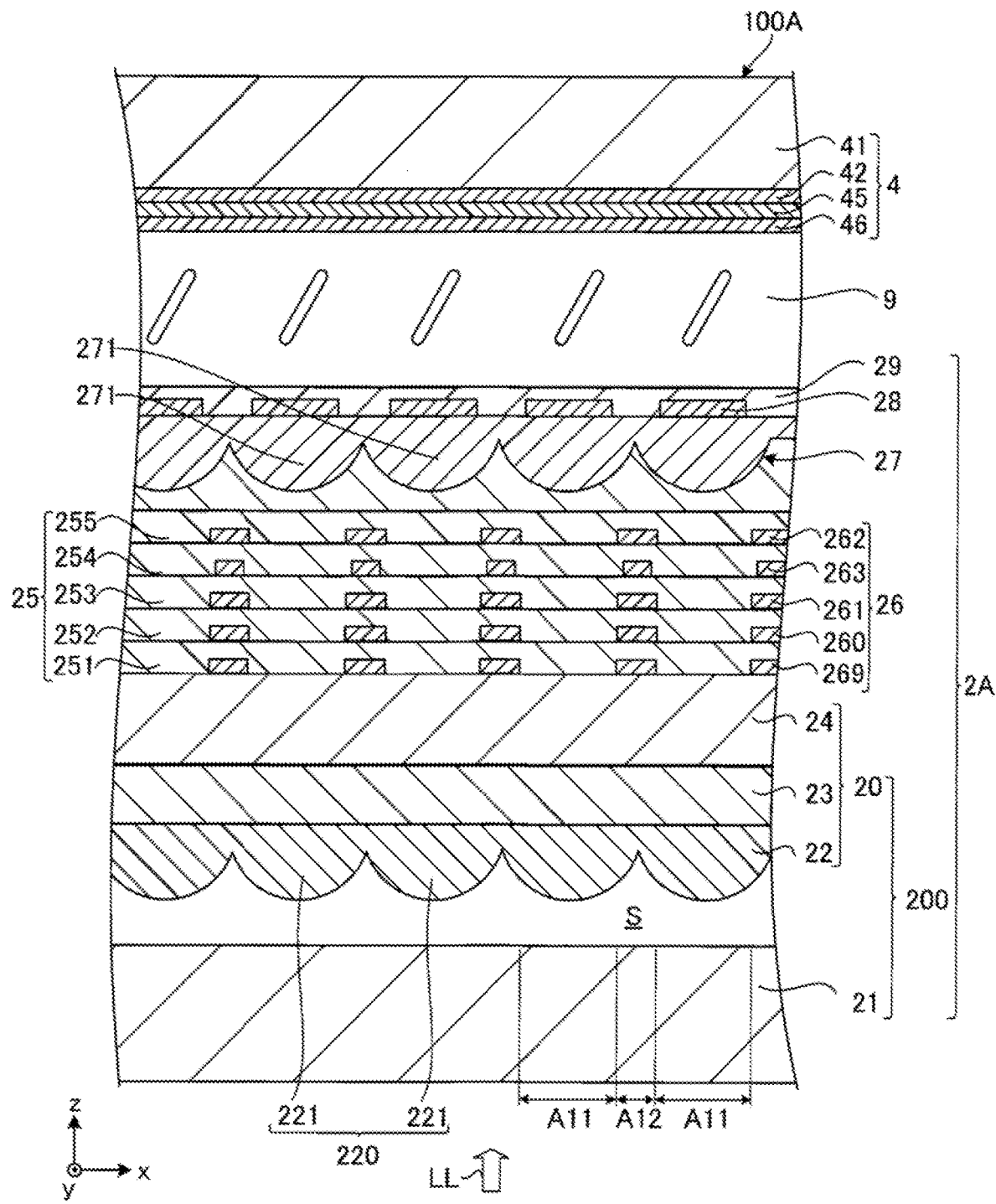
FIG. 22 is a partially enlarged view of an electro-optical device according to a second exemplary embodiment.

Next, a second exemplary embodiment of the present disclosure will be described. FIG. 22 is a partially enlarged view of an electro-optical device 100A according to a second exemplary embodiment. The present exemplary embodiment is different from the first exemplary embodiment in a configuration of an element substrate 2A. Note that, in the second exemplary embodiment, a sign used in the description of the first exemplary embodiment is used for the same matter as that of the first exemplary embodiment, and each detailed description thereof will be appropriately omitted.

The element substrate 2A included in the electro-optical device 100A illustrated in FIG. 22 includes a second lens layer 27 serving as a "second lens portion" that is disposed between a pixel electrode 28 and an insulating base 200 and includes a second lens 271 overlapping a lens 221 in plan view. One light transmission region A11, one lens 221, one second lens 271, and one pixel electrode 28 overlap each other in plan view. Further, the second lens 271 is formed of a convex lens that protrudes toward an insulator 25 and has a convex curved surface. The second lens 271 is hemispherical.

By providing the second lens 271, light LL that converges at the lens 221 can be substantially parallel to an optical axis of the light LL. Note that the optical axis is parallel to the z direction. By making the light LL substantially parallel, convergence of the light LL at a liquid crystal layer 9 can be suppressed, and thus variations in intensity of the light LL applied to liquid crystal molecules in the liquid crystal layer 9 can be reduced. Thus, even when a lens having a large F value is adopted in a projection optical system 4003, high light utilization efficiency can be acquired. Further, when passing through the liquid crystal layer 9, an oblique component of the light LL is reduced, and thus a decrease in contrast can be reduced.

1-3. Third Modification Example

Each of the exemplary embodiments exemplified in the above can be variously modified. Specific modification aspects applied to each of the exemplary embodiments described above are exemplified below. Two or more modes freely selected from exemplifications below can be appropriately used in combination as long as mutual contradiction does not arise.

1-3a. First Modification Example

The lens 221 in each of the exemplary embodiments described above is formed of a convex lens having a convex curved surface, but the lens 221 may be a concave lens having a concave curved surface. Similarly, the second lens 271 in the second exemplary embodiment is formed of a convex lens having a convex curved surface, but the second lens 271 may be a concave lens having a concave curved surface.

1-3b. Modification Example

The insulating base 200 in each of the exemplary embodiments described above includes the base portion 21 and the lens layer 22, but a configuration of the insulating base 200 is not limited thereto. For example, the base portion 21 and the lens layer 22 may be integrally formed.

1-3c. Third Modification Example

In each of the exemplary embodiments described above, the base portion 21 includes the recessed portion 211, but the base portion 21 may not include the recessed portion 211. For example, a recessed portion may be provided on the surface of the lens layer 22 on the +z axis side. In that case, for example, the lens assembly 220 can be provided on a bottom surface of the recessed portion.

1-3d. Fourth Modification Example

In each of the exemplary embodiments described above, the insulating base 200 includes the first translucent layer 23, but may not include the first light translucent layer 23. Further, the lens layer 22 may not be provided with the first hole 222 and the second hole 223. For example, a hole that penetrates in a thickness direction of the base portion 21 may be formed in the base portion 21.

Figure 23:
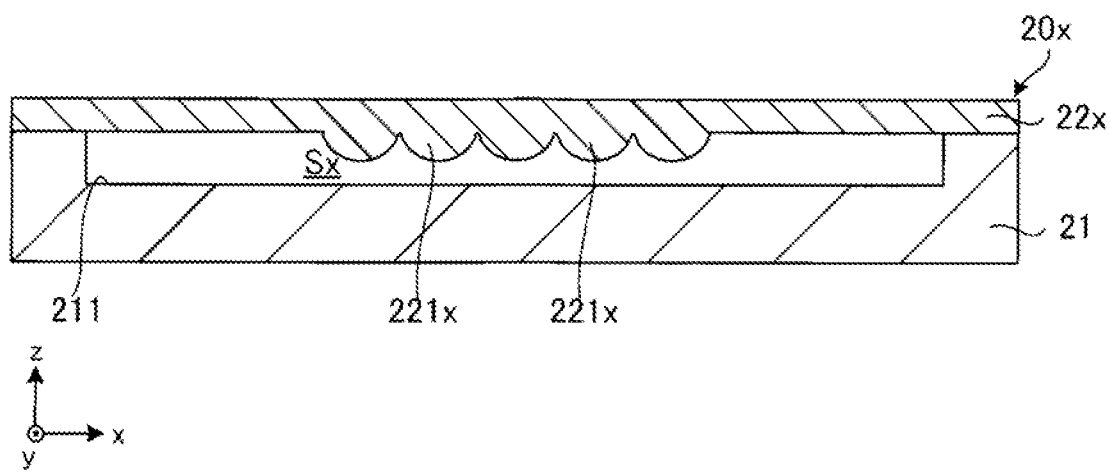
FIG. 23 is a cross-sectional view illustrating a structure including a lens layer according to a modification example.

FIG. 23 is a cross-sectional view illustrating a structure 20x including a lens layer 22x according to a modification example. The insulating base 200 may include the structure 20x formed of a base portion 21 and the lens layer 22x without the first hole 222 and the second hole 223 described above. The structure 20x illustrated in FIG. 23 is formed by, for example, bonding the lens layer 22x to the base portion 21 with an adhesive. However, in the structure 20x, there is a risk that variations in thickness of the adhesive may occur, and the lens layer 22x may be peeled from the base portion 21. Thus, as illustrated in FIG. 5, the insulating base 200 may be particularly configured to include the base portion 21, the lens layer 22, and the first translucent layer 23. With the base portion 21, the lens layer 22, and the first translucent layer 23, the space S can be suitably formed by the method using the etching described above, and thus the processing of bonding the lens layer 22 to the base portion 21 with an adhesive can be omitted. Therefore, the element substrate 2 having excellent lens performance can be formed efficiently and with high precision.

1-3e. Fifth Modification Example

Any element may be disposed between the base portion 21 and the lens layer 22. However, the base portion 21 and the lens layer 22 may have portions being in contact with each other as illustrated in FIG. 5. Similarly, any element may be disposed between the lens layer 22 and the first translucent layer 23. However, the lens layer 22 and the first translucent layer 23 may be in contact with each other as illustrated in FIG. 5.

1-3f. Sixth Modification Example

The lens assembly 220 is disposed between the first hole 222 and the second hole 223 in plan view in the first exemplary embodiment, but the arrangement of the first hole 222 and the second hole 223 is not limited to this, and any arrangement may be used. For example, the first hole 222 and the second hole 223 may be disposed on only one side of the outer shape 2201 having a substantially rectangular shape in plan view. Further, for example, the first hole 222 may be disposed along a long side of the outer shape 2201, and the second hole 223 may be disposed along a short side of the outer shape 2201. Further, in terms of improving etching efficiency, for example, the first hole 222 and the second hole 223 may be disposed along a long side of the outer shape 2201. Further, a planar area of the first hole 222 and a planar area of the second hole 223 are substantially equal in the first exemplary embodiment, but may be different from each other.

1-5g. Seventh Modification Example

In each of the exemplary embodiments described above, the "switching element" is the TFT 260, which is not limited thereto. The "switching element" may be, for example, a metal-oxide-semiconductor field-effect transistor (MOSFET) and the like.

1-5h. Eighth Modification Example

In each of the exemplary embodiments described above, the light LL is incident from the element substrate 2, but the light LL may be incident from the counter substrate 4.

2. Electronic Apparatus

The electro-optical device 100 can be used for various electronic apparatuses.

Figure 24:
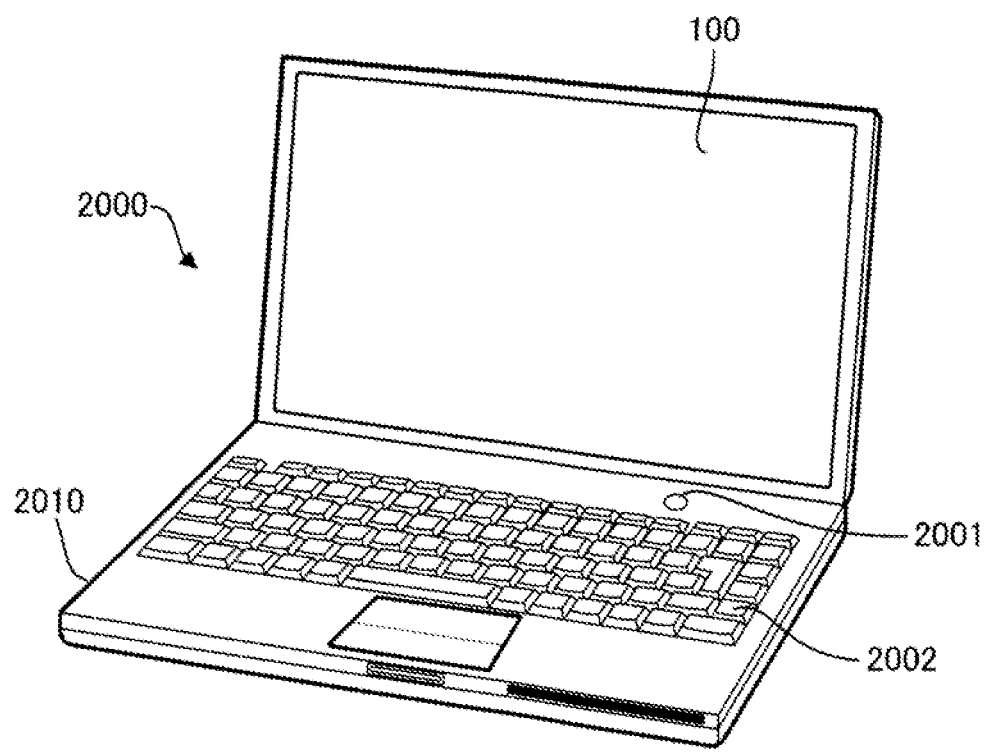
FIG. 24 is a perspective view illustrating a personal computer as an example of an electronic apparatus.

FIG. 24 is a perspective view illustrating a personal computer 2000 as an example of an electronic apparatus. The personal computer 2000 includes the electro-optical device 100 that displays various images, and a main body portion 2010 in which a power source switch 2001 and a keyboard 2002 are installed.

Figure 25:
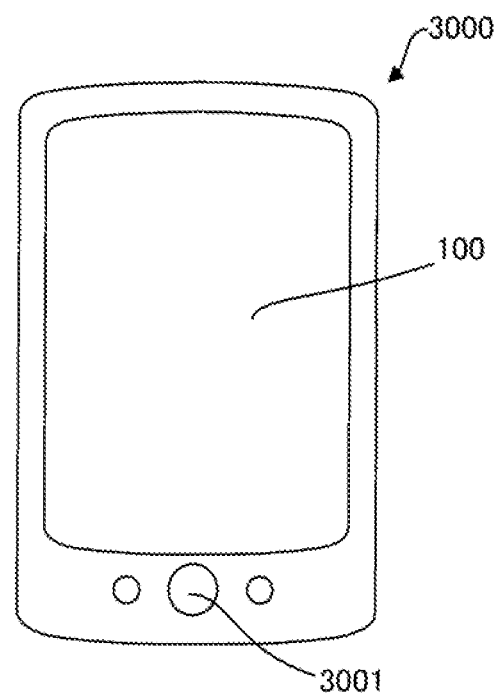
FIG. 25 is a perspective view illustrating a smartphone as an example of an electronic apparatus.

FIG. 25 is a perspective view illustrating a smartphone 3000 as an example of an electronic apparatus. The smartphone 3000 includes an operation button 3001 and the electro-optical device 100 that displays various images. A screen content displayed on the electro-optical device 100 is changed in accordance with an operation of the operation button 3001.

Figure 26:
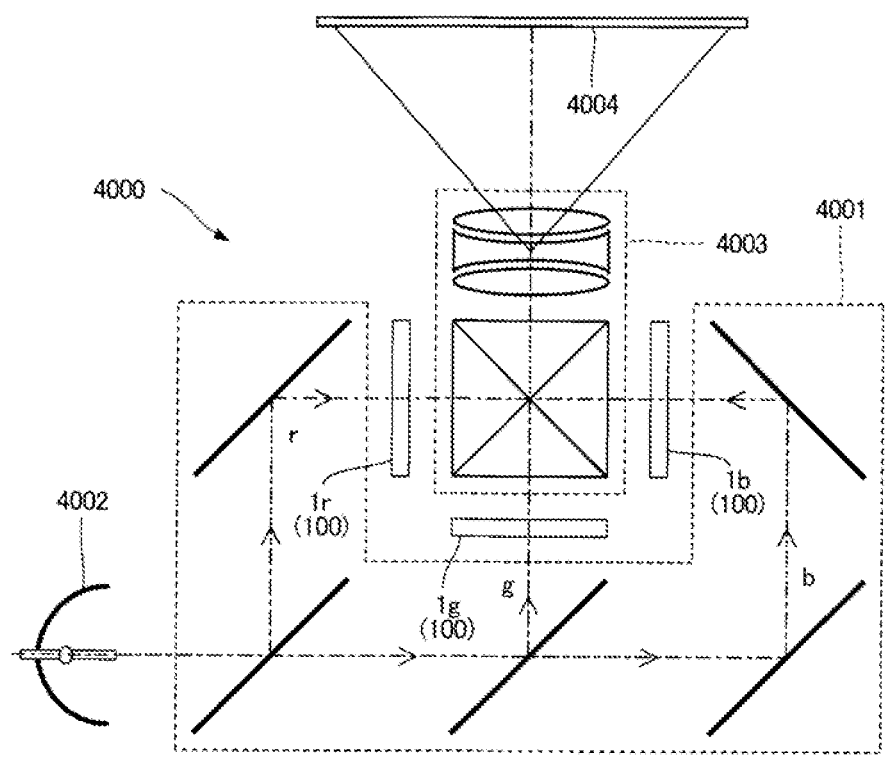
FIG. 26 is a schematic diagram illustrating a projector as example of an electronic apparatus.

FIG. 26 is a schematic diagram illustrating a projector as an example of an electronic apparatus. A projection-type display device 4000 is a three-plate type projector, for example. An electro-optical device 1r is an electro-optical device 100 corresponding to a red display color, an electro-optical device 1g is an electro-optical device 100 corresponding to a green display color, and an electro-optical device 1b is an electro-optical device 100 corresponding to a blue display color. Specifically, the projection-type display device 4000 includes the three electro-optical devices 1r, 1g, and 1b that respectively correspond to display colors of red, green, and blue.

An illumination optical system 4001 supplies a red element r of light emitted from an illumination device 4002 as a light source to the electro-optical device 1r, a green element g of the light to the electro-optical device 1g, and a blue element b of the light to the electro-optical device 1b. Each of the electro-optical devices 1r, 1g, and 1b functions as an optical modulator, such as a light bulb, that modulates respective rays of the monochromatic light supplied from the illumination optical system 4001 depending on display images. The projection optical system 4003 combines the rays of the light emitted from each of the electro-optical devices 1r, 1g, and 1b to project the combined light to a projection surface 4004.

Each of the personal computer 2000, the smartphone 3000, and the projection-type display device 4000, which are described above, includes the electro-optical device 100 described above. The electro-optical device 100 is provided, and thus the quality of each display in the personal computer 2000, the smartphone 3000, and the projection-type display device 4000 can be increased.

The present disclosure has been described above based on the preferred exemplary embodiments, but the present disclosure is not limited to each of the exemplary embodiments described above. In addition, the configuration of each component of the present disclosure may be replaced with any configuration that exerts the equivalent functions of the above-described exemplary embodiments, and to which any configuration may be added.

Note that an electronic apparatus to which the electro-optical device according to the present disclosure is applied is not limited to the exemplified apparatus. Examples of the electronic apparatus include a personal digital assistant (PDA), a digital still camera, a television, a video camera, a car navigation device, a display device for in-vehicle use, an electronic organizer, electronic paper, an electronic calculator, a word processor, a workstation, a visual telephone, a point of sale (POS) terminal, and the like. Other examples of the electronic apparatus to which the present disclosure is applied further include an apparatus including a printer, a scanner, a copier, a video player, or a touch panel.

In the description described above, the liquid crystal display device has been described as an example of the electro-optical device according to the present disclosure, but the electro-optical device according to the present disclosure is not limited thereto. For example, the electro-optical device according to the present disclosure can also be applied to an image sensor and the like. For example, the present disclosure can also be applied to a display panel using light-emitting devices such as organic electro luminescence (EL) devices, inorganic EL devices, and light-emitting polymers, similarly to the exemplary embodiments described above. Furthermore, the present disclosure can also be applied to an electrophoretic display panel that uses micro capsules each including colored liquid and white particles distributed in the liquid, similarly to the exemplary embodiments described above.

What is claimed is:

1. An electro-optical device, comprising:
   an insulating base having translucency and insulating properties;
   a pixel electrode disposed apart from the insulating base; and
   a switching element electrically coupled to the pixel electrode, wherein the insulating base includes
a base portion, and
a lens portion that is located between the base portion and the pixel electrode and includes a lens overlapping the pixel electrode in plan view when viewed from a thickness direction of the pixel electrode,
the base portion and the lens are disposed with a space therebetween,
the lens portion includes a through hole that communicates with the space, and
the insulating base further includes a translucent layer that is disposed at the lens portion, is disposed to fill the through hole, and has translucency and insulating properties.

2. The electro-optical device according to claim 1, further comprising a second lens portion that is disposed between the pixel electrode and the insulating base body and includes a second lens overlapping the lens in the plan view.

3. The electro-optical device according to claim 1, wherein
the translucent layer includes a coupling portion coupled to the base portion through the through hole.

4. The electro-optical device according to claim 1, wherein
the lens portion includes a second through hole that communicates with the space.

5. The electro-optical device according to claim 1, wherein
light is transmitted from the base portion toward the pixel electrode.

6. The electro-optical device according to claim 1, further comprising:
an element substrate including the insulating base, the pixel electrode, and the switching element;
a counter substrate including a counter electrode; and
a liquid crystal disposed between the element substrate and the counter substrate, wherein
the counter substrate does not include an optical member that converges or diverges light.

7. An electronic apparatus, comprising:
the electro-optical device according to claim 1.

8. A method for manufacturing an electro-optical device, comprising:
forming an insulating base having translucency and insulating properties;
forming a switching element at the insulating base; and
forming a pixel electrode electrically coupled to the switching element, wherein
the formation of the insulating base includes forming a base portion and a lens portion with a space therebetween, the lens portion being located between the base portion and the pixel electrode and including a lens overlapping the pixel electrode in plan view when viewed from a thickness direction of the pixel electrode;
the formation of the lens portion includes forming a through hole of the lens portion, the through hole communicating with the space, and
formation of the insulating base further includes forming a translucent layer that is disposed at the lens portion, is disposed to fill the through hole, and has translucency and insulating properties.

* * * * *